US009806829B2

(12) United States Patent
Song

(10) Patent No.: US 9,806,829 B2
(45) Date of Patent: Oct. 31, 2017

(54) CHANNEL CALIBRATION APPARATUS AND METHOD

(71) Applicant: Huawei Technologies Co., Ltd., Shenzhen (CN)

(72) Inventor: Keyu Song, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/275,715

(22) Filed: Sep. 26, 2016

(65) Prior Publication Data

US 2017/0012717 A1    Jan. 12, 2017

Related U.S. Application Data

(63) Continuation of application No. PCT/CN2014/073966, filed on Mar. 24, 2014.

(51) Int. Cl.
*H01Q 7/00* (2006.01)
*H04B 17/21* (2015.01)
(Continued)

(52) U.S. Cl.
CPC ............ *H04B 17/21* (2015.01); *H01Q 7/00* (2013.01); *H04B 17/14* (2015.01); *H04B 17/17* (2015.01);
(Continued)

(58) Field of Classification Search
CPC .......... H01Q 7/00; H01Q 11/12; H01Q 21/00; H01Q 1/20; G01R 29/10; H04B 17/14;
(Continued)

(56) References Cited

U.S. PATENT DOCUMENTS 5,543,801 A * 8/1996 Shawyer ................ H01Q 3/267
342/174
5,592,490 A * 1/1997 Barratt ................... H01Q 1/246
370/310

(Continued)

FOREIGN PATENT DOCUMENTS

CN          1388668 A      1/2003
CN        102404033 A      4/2012
(Continued)

*Primary Examiner* — Tho G Phan
(74) *Attorney, Agent, or Firm* — Slater Matsil, LLP

(57) ABSTRACT

A channel calibration apparatus includes a detection module, configured to detect self-loopback responses, transmission responses, and receiving responses of a to-be-calibrated antenna and a reference antenna. The apparatus also includes a processing module, configured to determine, according to the transmission responses, and the receiving responses of the to-be-calibrated antenna and the reference antenna, and according to transport channel responses, transmission responses and receive channel responses that are of the to-be-calibrated antenna and the reference antenna and obtained after processing of transmit channel responses, and then determine a transmit channel compensation response and a receive channel compensation response that are of the to-be-calibrated antenna. The processing module is also configured to make compensation for a transmit channel of the to-be-calibrated antenna according to the transmit channel compensation response, and make compensation for a receive channel of the to-be-calibrated antenna according to the receive channel compensation response.

19 Claims, 7 Drawing Sheets

(51) Int. Cl.
*H04B 17/14* (2015.01)
*H04B 17/17* (2015.01)
*H04L 25/02* (2006.01)
*H04B 17/309* (2015.01)

(52) U.S. Cl.
CPC ........ *H04B 17/309* (2015.01); *H04L 25/0206* (2013.01)

(58) Field of Classification Search
CPC ...... H04B 17/17; H04B 17/21; H04B 17/309; H04L 25/0206
See application file for complete search history.

(56) References Cited

U.S. PATENT DOCUMENTS

| | | | | |
|---|---|---|---|---|
| 6,346,910 | B1 * | 2/2002 | Ito | H01Q 3/2611 342/174 |
| 6,738,020 | B1 * | 5/2004 | Lindskog | H01Q 3/2605 342/175 |
| 8,891,598 | B1 * | 11/2014 | Wang | H04L 25/0398 370/241 |
| 9,154,969 | B1 * | 10/2015 | Srinivasa | H04W 24/00 |
| 2008/0297402 | A1 * | 12/2008 | Wooldridge | G01S 7/024 342/174 |
| 2010/0067588 | A1 | 3/2010 | Takano | |

FOREIGN PATENT DOCUMENTS

| | | |
|---|---|---|
| CN | 102624470 A | 8/2012 |
| CN | 103166881 A | 6/2013 |
| CN | 103595665 A | 2/2014 |
| WO | 2010034184 A1 | 4/2010 |
| WO | 2012074446 A1 | 6/2012 |

* cited by examiner

CHANNEL CALIBRATION APPARATUS AND METHOD

CROSS-REFERENCE TO RELATED APPLICATIONS

This application is a continuation of International Application No. PCT/CN2014/073966, filed on Mar. 24, 2014, the disclosure of which is hereby incorporated by reference in its entirety.

TECHNICAL FIELD

This application relates to the communications field, and in particular, to a channel calibration apparatus and method.

BACKGROUND

In a system of a large-scale antenna array, to ensure a system gain brought by a beamforming technology and make full use of a high spatial resolution capability brought by the antenna array, it needs to be ensured that transmission responses of all antennas in an antenna array on a base station side are the same, and receiving responses of all the antennas are also the same. Therefore, transmit channels and receive channels of the antennas need to be calibrated, so that impact brought by an individual difference among all the antennas on the antenna array is avoided.

The prior art provides a channel calibration apparatus, which includes a coupling disk 110, to-be-calibrated transmit channels 120, to-be-calibrated receive channels 130, a calibration transmit channel 140, and a calibration receive channel 150. All the to-be-calibrated transmit channels 120 are coupled to the calibration receive channel 150 by using the coupling disk 110, and all the to-be-calibrated receive channels 130 are coupled to the calibration transmit channel 140 by using the coupling disk 110. When the transmit channels are being calibrated, each of the to-be-calibrated transmit channels 120 sends a calibration signal to the calibration receive channel 150 by using the coupling disk 110, after receiving calibration signals sent by all the to-be-calibrated transmit channels 120, the calibration receive channel 150 may compare the received calibration signals with the calibration signals before sending, so as to obtain transmission responses of all the to-be-calibrated transmit channels 120, where the transmission responses include to-be-calibrated-transmit-channel responses, transport channel responses, and calibration-receive-channel responses Generally, consistency among the transport channel responses of all channels in the coupling disk 110 is relatively high, and the calibration receive channel responses are the same; therefore, it may be considered that inconsistency among the transmission responses is caused by inconsistency among responses of the to-be-calibrated transmit channels. Calibration of the to-be-calibrated transmit channels 120 may be completed provided that compensation is made for the responses of the to-be-calibrated transmit channels. Likewise, calibration of the to-be-calibrated receive channels 130 may be implemented in a manner in which the calibration transmit channel 140 sends a calibration signal to each of the to-be-calibrated receive channels 130 by using the coupling disk 110.

With the development of technologies of a large-scale antenna array, there may be tens or even hundreds of antennas in an antenna array. If a manner of calibration by using a coupling disk 110 is used, the coupling disk 110 also needs to have transport channels in a corresponding-scale quantity. However, it is quite difficult to manufacture a coupling disk with many transport channels, and even if a coupling disk with many transport channels is manufactured, consistency among the transport channels can hardly be ensured either. Inconsistency among the transmission channels may cause inaccuracy of antenna calibration results.

SUMMARY

This application provides a channel calibration apparatus and method, which can correct an error caused by inconsistency among transport channel responses, and improve calibration precision.

A first aspect of this application provides a channel calibration apparatus, including a detection module, configured to detect self-loopback responses, transmission responses, and receiving responses of a to-be-calibrated antenna and a reference antenna, where the self-loopback response of the to-be-calibrated antenna is a ratio of a signal sent by a transmit channel of the to-be-calibrated antenna to a signal received by a receive channel of the to-be-calibrated antenna when the signal sent by the transmit channel of the to-be-calibrated antenna is received by the receive channel of the to-be-calibrated antenna. The transmission response of the to-be-calibrated antenna is a ratio of a signal sent by a transmit channel of the to-be-calibrated antenna to a signal received by a receive channel of a calibration channel when the signal sent by the transmit channel of the to-be-calibrated antenna is received by the receive channel of the calibration channel. Additionally, the receiving response of the to-be-calibrated antenna is a ratio of a signal sent by a transmit channel of a calibration channel to a signal received by a receive channel of the to-be-calibrated antenna when the signal sent by the transmit channel of the calibration channel is received by the receive channel of the to-be-calibrated antenna. Also, the self-loopback response of the reference antenna is a ratio of a signal sent by a transmit channel of the reference antenna to a signal received by a receive channel of the reference antenna when the signal sent by the transmit channel of the reference antenna is received by the receive channel of the reference antenna. Additionally, the transmission response of the reference antenna is a ratio of a signal sent by a transmit channel of the reference antenna to a signal received by a receive channel of a calibration channel when the signal sent by the transmit channel of the reference antenna is received by the receive channel of the calibration channel. The receiving response of the reference antenna is a ratio of a signal sent by a transmit channel of a calibration channel to a signal received by a receive channel of the reference antenna when the signal sent by the transmit channel of the calibration channel is received by the receive channel of the reference antenna. The apparatus also includes a processing module, configured to determine, according to the self-loopback responses, the transmission responses, and the receiving responses of the to-be-calibrated antenna and the reference antenna and according to transport channel responses, transmission responses and receiving responses that are of the to-be-calibrated antenna and the reference antenna and obtained after processing. The processing module is also configured to determine, according to the transmission responses and the receiving responses that are of the to-be-calibrated antenna and the reference antenna and obtained after processing, a transmit channel compensation response and a receive channel compensation response that are of the to-be-calibrated antenna and make compensation for the transmit channel of the to-be-calibrated antenna according to the transmit channel compensation response, so that a transmit channel response that is of the to-be-calibrated antenna and obtained after compensation is consistent with a transmit channel response of the reference antenna. Additionally, the processing module is configured to make compensation for the receive channel of the to-be-calibrated antenna according to the receive channel compensation response, so that a receive channel response that is of the to-be-calibrated antenna and obtained after compensation is consistent with a receive channel response of the reference antenna.

With reference to the first aspect, in a first possible implementation manner of the first aspect of this application, the detection module is further configured to: detect a self-loopback response of a calibration channel, where the self-loopback response of the calibration channel is a ratio of a signal sent by a transmit channel of the calibration channel to a signal received by a receive channel of the calibration channel when the signal sent by the transmit channel of the calibration channel is received by the receive channel of the calibration channel.

With reference to the first possible implementation manner of the first aspect, in a second possible implementation manner of the first aspect of this application, the processing module is further configured to: number the to-be-calibrated antenna and the reference antenna together, and determine, according to the following formula, a transport channel response H(n) of an antenna whose sequence number is n:

$$H(n)=[(H_T(n)H_R(n))/(H_{CYC}(n)*H_{CYC}(M))]^{1/2};$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, $H_{CYC}(n)$ is a self-loopback response of the antenna whose sequence number is n, M is a sequence number of the calibration channel, M is a positive integer, and $H_{CYC}(M)$ is a self-loopback response of the calibration channel whose sequence number is M.

With reference to the second possible implementation manner of the first aspect, in a third possible implementation manner of the first aspect of this application, the processing module is further configured to: determine, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and determine, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n.

With reference to the first aspect, in a fourth possible implementation manner of the first aspect of this application, the processing module is further configured to: number the to-be-calibrated antenna and the reference antenna together, and determine, according to the following formula, a transport channel response H(n) of an antenna whose sequence number is n.

$$H(n)=[(H_T(n)H_R(n))/H_{CYC}(n)]^{1/2};$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, and $H_{CYC}(n)$ is a self-loopback response of the antenna whose sequence number is n.

With reference to the fourth possible implementation manner of the first aspect, in a fifth possible implementation manner of the first aspect of this application, the processing module is further configured to: obtain, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and obtain, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n.

With reference to the third or the fifth possible implementation manner of the first aspect, in a sixth possible implementation manner of the first aspect of this application, the processing module is further configured to determine, according to the transmission responses and the receiving responses that are of the to-be-calibrated antenna and the reference antenna and obtained after processing, the transmit channel compensation response and the receive channel compensation response that are of the to-be-calibrated antenna, which is specifically: the processing module is configured to determine, according to the following formula, a transmit channel compensation response $H_{TXC}(a)$ of a to-be-calibrated antenna whose sequence number is a:

$$H_{TXC}(a)=H_T(b)'/H_T(a).$$

where a is the sequence number of the to-be-calibrated antenna, b is a sequence number of the reference antenna, a+b=N, N is the total quantity of the to-be-calibrated antenna and the reference antenna, $H_T(b)'$ is a transmission response that is of the reference antenna whose sequence number is b and obtained after processing, and $H_T(a)$ is a transmission response that is of the to-be-calibrated antenna whose sequence number is a and obtained after processing; and the processing module is configured to determine, according to the following formula, a receive channel compensation response $H_{RXC}(a)$ of the to-be-calibrated antenna whose sequence number is a:

$$H_{RXC}(a)=H_R(b)'/H_R(a);$$

where $H_R(b)'$ is a receiving response that is of the reference antenna whose sequence number is b and obtained after processing, and $H_R(a)'$ is a receiving response that is of the to-be-calibrated antenna whose sequence number is a and obtained after processing.

With reference to the first aspect or any one of the first to the sixth possible implementation manners of the first aspect, in a seventh possible implementation manner of the first aspect of this application, the calibration apparatus further includes a calibration antenna, and the calibration channel is a transmit channel and a receive channel of the calibration antenna.

A second aspect of this application provides a channel calibration apparatus, including a detection module, a processing module, and a radio frequency calibration module, where the detection module is configured to detect self-loopback responses, transmission responses, and receiving responses of a to-be-calibrated antenna and a reference antenna, where the self-loopback response of the to-be-calibrated antenna is a ratio of a signal sent by a transmit channel of the to-be-calibrated antenna to a signal received by a receive channel of the to-be-calibrated antenna when the signal sent by the transmit channel of the to-be-calibrated antenna is received by the receive channel of the to-be-calibrated antenna. The transmission response of the to-be-calibrated antenna is a ratio of a signal sent by a transmit channel of the to-be-calibrated antenna to a signal received by a receive channel of a calibration channel when the signal sent by the transmit channel of the to-be-calibrated antenna is received by the receive channel of the calibration channel, and the receiving response of the to-be-calibrated antenna is a ratio of a signal sent by a transmit channel of a calibration channel to a signal received by a receive channel of the to-be-calibrated antenna when the signal sent by the transmit channel of the calibration channel is received by the receive channel of the to-be-calibrated antenna. Additionally, the self-loopback response of the reference antenna is a ratio of a signal sent by a transmit channel of the reference antenna to a signal received by a receive channel of the reference antenna when the signal sent by the transmit channel of the reference antenna is received by the receive channel of the reference antenna, and the transmission response of the reference antenna is a ratio of a signal sent by a transmit channel of the reference antenna to a signal received by a receive channel of a calibration channel when the signal sent by the transmit channel of the reference antenna is received by the receive channel of the calibration channel. Also, the receiving response of the reference antenna is a ratio of a signal sent by a transmit channel of a calibration channel to a signal received by a receive channel of the reference antenna when the signal sent by the transmit channel of the calibration channel is received by the receive channel of the reference antenna, and the detection module sends the self-loopback responses, the transmission responses, and the receiving responses of the to-be-calibrated antenna and the reference antenna to the processing module. The processing module is configured to receive the self-loopback responses, the transmission responses, and the receiving responses of the to-be-calibrated antenna and the reference antenna. The processing module is also configured to determine, according to the self-loopback responses, the transmission responses, and the receiving responses of the to-be-calibrated antenna and the reference antenna and according to transport channel responses, transmission responses and receiving responses that are of the to-be-calibrated antenna and the reference antenna and obtained after processing, and then determine, according to the transmission responses and the receiving responses that are of the to-be-calibrated antenna and the reference antenna and obtained after processing, a transmit channel compensation response and a receive channel compensation response that are of the to-be-calibrated antenna.

Additionally, the processing module sends the transmit channel compensation response and the receive channel compensation response to the radio frequency calibration module. The radio frequency calibration module is configured to: receive the transmit channel compensation response and the receive channel compensation response and make compensation for the transmit channel of the to-be-calibrated antenna according to the transmit channel compensation response, so that a transmit channel response that is of the to-be-calibrated antenna and obtained after compensation is consistent with a transmit channel response of the reference antenna. The radio frequency module is also configured to make compensation for the receive channel of the to-be-calibrated antenna according to the receive channel compensation response, so that a receive channel response that is of the to-be-calibrated antenna and obtained after compensation is consistent with a receive channel response of the reference antenna.

With reference to the second aspect, in a second possible implementation manner of the first aspect of this application, the detection module is further configured to detect a self-loopback response of a calibration channel, and the self-loopback response of the calibration channel is a ratio of a signal sent by a transmit channel of the calibration channel to a signal received by a receive channel of the calibration channel when the signal sent by the transmit channel of the calibration channel is received by the receive channel of the calibration channel.

With reference to the first possible implementation manner of the second aspect, in a second possible implementation manner of the second aspect of this application, the processing module is further configured to: number the to-be-calibrated antenna and the reference antenna together, and determine, according to the following formula, a transport channel response $H(n)$ of an antenna whose sequence number is n:

$$H(n)=[(H_T(n)H_R(n))/(H_{CYC}(n)*H_{CYC}(M))]^{1/2};$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, $H_{CYC}(n)$ is a self-loopback response of the antenna whose sequence number is n, M is a sequence number of the calibration channel, M is a positive integer, and $H_{CYC}(M)$ is a self-loopback response of the calibration channel whose sequence number is M.

With reference to the second possible implementation manner of the second aspect, in a third possible implementation manner of the second aspect of this application, the processing module is further configured to: determine, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and determine, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n.

With reference to the second aspect, in a fourth possible implementation manner of the second aspect of this application, the processing module is further configured to: number the to-be-calibrated antenna and the reference antenna together, and determine, according to the following formula, a transport channel response H(n) of an antenna whose sequence number is n:

$$H(n)=[(H_T(n)H_R(n))/H_{CYC}(n)]^{1/2}.$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, and $H_{CYC}(n)$ is a self-loopback response of the antenna whose sequence number is n.

With reference to the fourth possible implementation manner of the second aspect, in a fifth possible implementation manner of the second aspect of this application, the processing module is further configured to: obtain, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and obtain, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n.

With reference to the third or the fifth possible implementation manner of the second aspect, in a sixth possible implementation manner of the second aspect of this application, the processing module is further configured to determine, according to the transmission responses and the receiving responses that are of the to-be-calibrated antenna and the reference antenna and obtained after processing, the transmit channel compensation response and the receive channel compensation response that are of the to-be-calibrated antenna, which is specifically: the processing module is configured to determine, according to the following formula, a transmit channel compensation response $H_{TXC}(a)$ of a to-be-calibrated antenna whose sequence number is a:

$$H_{TXC}(a)=H_T(b)'/H_T(a)';$$

where a is the sequence number of the to-be-calibrated antenna, b is a sequence number of the reference antenna, a+b=N, N is the total quantity of the to-be-calibrated antenna and the reference antenna, $H_T(b)'$ is a transmission response that is of the reference antenna whose sequence number is b and obtained after processing, and $H_T(a)'$ is a transmission response that is of the to-be-calibrated antenna whose sequence number is a and obtained after processing; and the processing module is configured to determine, according to the following formula, a receive channel compensation response $H_{RXC}(a)$ of the to-be-calibrated antenna whose sequence number is a:

$$H_{RXC}(a)=H_R(b)'/H_R(a)';$$

where $H_R(b)'$ is a receiving response that is of the reference antenna whose sequence number is b and obtained after processing, and $H_R(a)'$ is a receiving response that is of the to-be-calibrated antenna whose sequence number is a and obtained after processing.

A third aspect of this application provides a channel calibration method, including the following steps: detecting self-loopback responses, transmission responses, and receiving responses of a to-be-calibrated antenna and a reference antenna, where the self-loopback response of the to-be-calibrated antenna is a ratio of a signal sent by a transmit channel of the to-be-calibrated antenna to a signal received by a receive channel of the to-be-calibrated antenna when the signal sent by the transmit channel of the to-be-calibrated antenna is received by the receive channel of the to-be-calibrated antenna; the transmission response of the to-be-calibrated antenna is a ratio of a signal sent by a transmit channel of the to-be-calibrated antenna to a signal received by a receive channel of a calibration channel when the signal sent by the transmit channel of the to-be-calibrated antenna is received by the receive channel of the calibration channel; the receiving response of the to-be-calibrated antenna is a ratio of a signal sent by a transmit channel of a calibration channel to a signal received by a receive channel of the to-be-calibrated antenna when the signal sent by the transmit channel of the calibration channel is received by the receive channel of the to-be-calibrated antenna; the self-loopback response of the reference antenna is a ratio of a signal sent by a transmit channel of the reference antenna to a signal received by a receive channel of the reference antenna when the signal sent by the transmit channel of the reference antenna is received by the receive channel of the reference antenna; the transmission response of the reference antenna is a ratio of a signal sent by a transmit channel of the reference antenna to a signal received by a receive channel of a calibration channel when the signal sent by the transmit channel of the reference antenna is received by the receive channel of the calibration channel; the receiving response of the reference antenna is a ratio of a signal sent by a transmit channel of a calibration channel to a signal received by a receive channel of the reference antenna when the signal sent by the transmit channel of the calibration channel is received by the receive channel of the reference antenna; determining, according to the self-loopback responses, the transmission responses, and the receiving responses of the to-be-calibrated antenna and the reference antenna and according to transport channel responses, transmission responses and receiving responses that are of the to-be-calibrated antenna and the reference antenna and obtained after processing, and then determining, according to the transmission responses and the receiving responses that are of the to-be-calibrated antenna and the reference antenna and obtained after processing, a transmit channel compensation response and a receive channel compensation response that are of the to-be-calibrated antenna; and making compensation for the transmit channel of the to-be-calibrated antenna according to the transmit channel compensation response, so that a transmit channel response that is of the to-be-calibrated antenna and obtained after compensation is consistent with a transmit channel response of the reference antenna, and making compensation for the receive channel of the to-be-calibrated antenna according to the receive channel compensation response, so that a receive channel response that is of the to-be-calibrated antenna and obtained after compensation is consistent with a receive channel response of the reference antenna.

With reference to the third aspect, in a first possible implementation manner of the third aspect of this application, before the step of determining, according to the self-loopback responses, the transmission responses, and the receiving responses of the to-be-calibrated antenna and the reference antenna and according to transport channel responses, transmission responses and receiving responses that are of the to-be-calibrated antenna and the reference antenna and obtained after processing, the method further includes the following step: detecting a self-loopback response of the calibration channel, where the self-loopback response of the calibration channel is a ratio of a signal sent by a transmit channel of the calibration channel to a signal received by a receive channel of the calibration channel when the signal sent by the transmit channel of the calibration channel is received by the receive channel of the calibration channel.

With reference to the first possible implementation manner of the third aspect, in a second possible implementation manner of the third aspect of this application, after the step of detecting a self-loopback response of the calibration channel, before the step of determining, according to the self-loopback responses, the transmission responses, and the receiving responses of the to-be-calibrated antenna and the reference antenna and according to transport channel responses, transmission responses and receiving responses that are of the to-be-calibrated antenna and the reference antenna and obtained after processing, the method further includes the following steps: numbering the to-be-calibrated antenna and the reference antenna together, and determining, according to the following formula, a transport channel response H(n) of an antenna whose sequence number is n:

$$H(n)=[(H_T(n)H_R(n))/(H_{CYC}(n)*H_{CYC}(M))]^{1/2};$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, $H_{CYC}(n)$ is a self-loopback response of the antenna whose sequence number is n, M is a sequence number of the calibration channel, M is a positive integer, and $H_{CYC}(M)$ is a self-loopback response of the calibration channel whose sequence number is M.

With reference to the second possible implementation manner of the third aspect, in a third possible implementation manner of the third aspect of this application, the step of determining, according to transport channel responses, transmission responses and receiving responses that are of the to-be-calibrated antenna and the reference antenna and obtained after processing is specifically: determining, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and determining, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n.

With reference to the third aspect, in a fourth possible implementation manner of the third aspect of this application, before the step of determining, according to transport channel responses, transmission responses and receiving responses that are of the to-be-calibrated antenna and the reference antenna and obtained after processing, further including the following steps: numbering the to-be-calibrated antenna and the reference antenna together, and determining, according to the following formula, a transport channel response H(n) of an antenna whose sequence number is n.

$$H(n)=[(H_T(n)H_R(n))/H_{CYC}(n)]^{1/2};$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, and $H_{CYC}(n)$ is a self-loopback response of the antenna whose sequence number is n.

With reference to the fourth possible implementation manner of the third aspect, in a fifth possible implementation manner of the third aspect of this application, the step of determining, according to transport channel responses, transmission responses and receiving responses that are of the to-be-calibrated antenna and the reference antenna and obtained after processing is specifically: obtaining, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and obtaining, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n.

With reference to the third or the fifth possible implementation manner of the third aspect, in a sixth possible implementation manner of the third aspect of this application, the determining, according to the transmission responses and the receiving responses that are of the to-be-calibrated antenna and the reference antenna and obtained after processing, a transmit channel compensation response and a receive channel compensation response that are of the to-be-calibrated antenna is specifically: determining, according to the following formula, a transmit channel compensation response $H_{TXC}(a)$ of a to-be-calibrated antenna whose sequence number is a:

$$H_{TXC}(a)=H_T(b)'/H_T(a)';$$

where a is the sequence number of the to-be-calibrated antenna, b is a sequence number of the reference antenna, a+b=N, N is the total quantity of the to-be-calibrated antenna and the reference antenna, $H_T(b)'$ is a transmission response that is of the reference antenna whose sequence number is b and obtained after processing, and $H_T(a)'$ is a transmission response that is of the to-be-calibrated antenna whose sequence number is a and obtained after processing; and determining, according to the following formula, a receive channel compensation response $H_{RXC}(a)$ of the to-be-calibrated antenna whose sequence number is a:

$$H_{RXC}(a)=H_R(b)'/H_R(a)';$$

where $H_R(b)'$ is a receiving response that is of the reference antenna whose sequence number is b and obtained after processing, and $H_R(a)'$ is a receiving response that is of the to-be-calibrated antenna whose sequence number is a and obtained after processing.

With reference to the third aspect or any one of the first to the sixth possible implementation manners of the third aspect, the calibration apparatus further includes a calibration antenna, and the calibration channel is a transmit channel and a receive channel of the calibration antenna.

In the implementation manners, transport channel responses are obtained according to self-loopback responses, transmission responses, and receiving responses of a to-be-calibrated antenna and a reference antenna; the transport channel responses are canceled from the transmission responses and the receiving responses of the to-be-calibrated antenna and the reference antenna to obtain new transmission responses and new receiving responses; then a transmit channel compensation response and a receive channel compensation response are obtained according to the new transmission responses and the new receiving responses; then compensation is made respectively for a transmit channel and a receive channel according to the transmit channel compensation response and the receive channel compensation response, so that calibration of the antenna is implemented. In this application, a transport channel response is canceled from a transmission response and a receiving response, which can avoid that the transport channel response is brought into compensation; therefore, an error caused by inconsistency among transport channel responses can be corrected, and calibration precision is improved.

In addition, in an embodiment, an error caused by inconsistency among transport channel responses is corrected by using an algorithm, and a chip in the prior art has a quite high calculation capability and is cost-effective; therefore, inconsistency among transport channel responses can be corrected very easily, and costs are reduced.

DETAILED DESCRIPTION OF ILLUSTRATIVE EMBODIMENTS

In the following description, for a purpose of description instead of limitation, specific details such as a particular system structure, an interface, and a technology are provided to make a thorough understanding of this application. However, a person skilled in the art should understand that this application can also be implemented in other implementation manners without these specific details. In another case, detailed descriptions of well-known apparatuses, circuits and methods are omitted, so that this application is described without being disturbed by unnecessary details.

Figure 1:
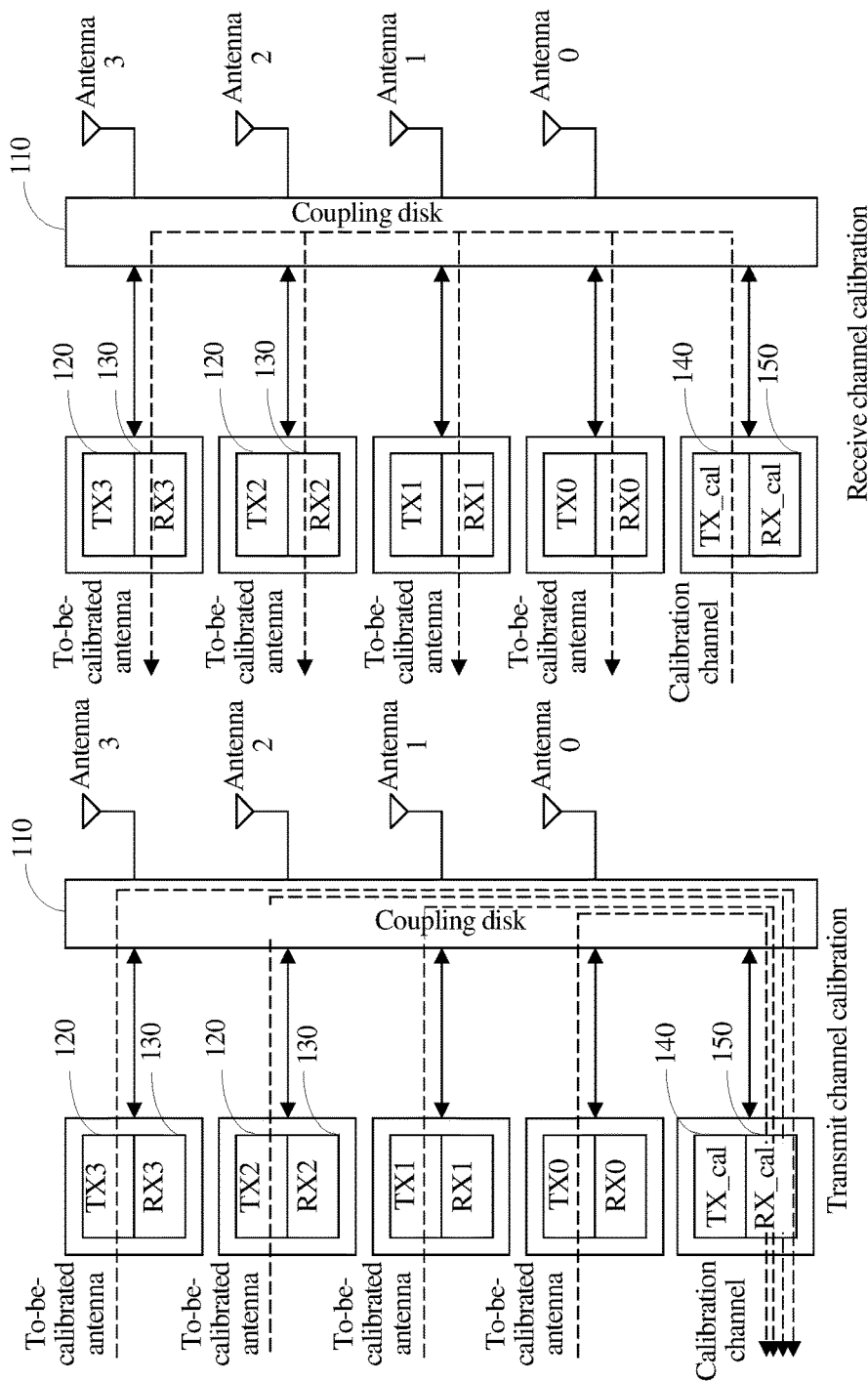
FIG. 1 is a schematic structural diagram of an implementation manner of a channel calibration apparatus in the prior art.
Figure 2:
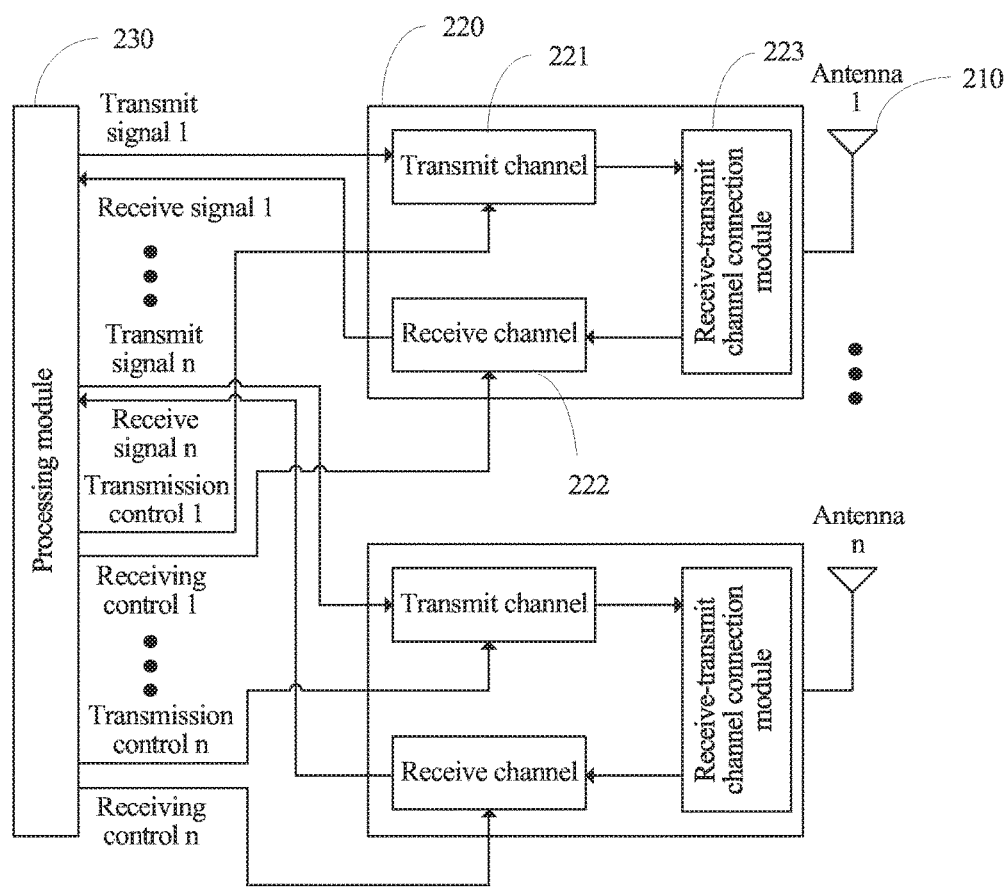
FIG. 2 is a schematic structural diagram of an implementation manner of a channel calibration apparatus according to this application.

Referring to FIG. 2, FIG. 2 is a schematic structural diagram of an implementation manner of a channel calibration apparatus according to this application. The channel calibration apparatus in this implementation manner includes an antenna 210, a receive and transmit link 220, and a processing module 230. The receive and transmit link 220 includes a transmit channel 221, a receive channel 222, and a receive-transmit channel connection module 223. The antenna 210 is connected to the receive and transmit link 220, and the receive and transmit link 220 is connected to the processing module 230. A first end of the receive-transmit channel connection module 223 is connected to the transmit channel 221, and a second end of the receive-transmit channel connection module 223 is connected to the receive channel 222.

Figure 3:
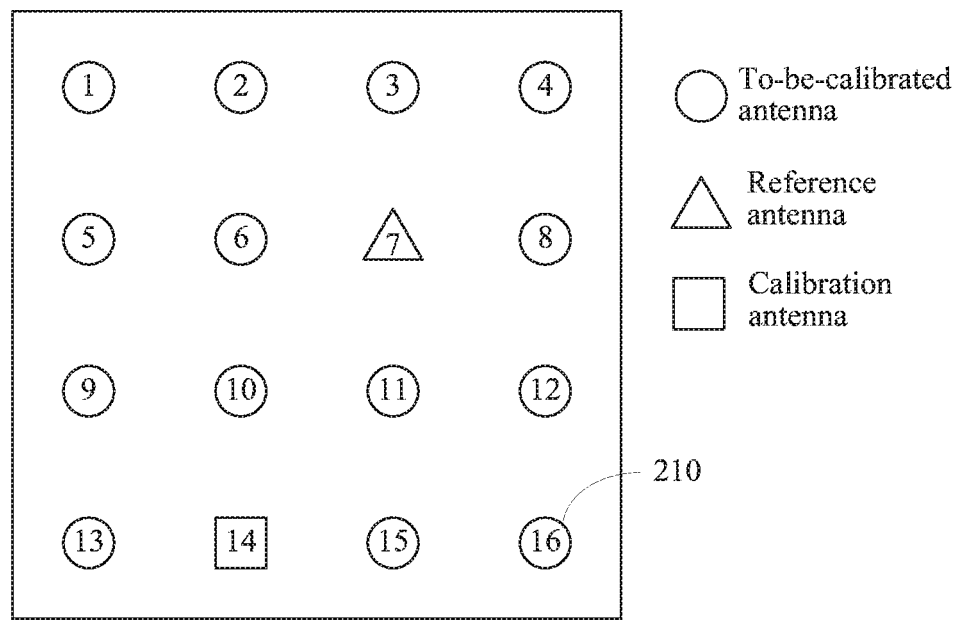
FIG. 3 is a schematic structural diagram of an implementation manner of an antenna array in a channel calibration apparatus according to this application.

Referring to FIG. 3, FIG. 3 is a schematic structural diagram of an implementation manner of an antenna array in a channel calibration apparatus according to this application. The antenna array includes multiple antennas. Before calibration starts, one antenna is selected from the antenna array as a reference antenna, and then one antenna is selected as a calibration antenna. The rest is a to-be-calibrated antenna.

Figure 4:
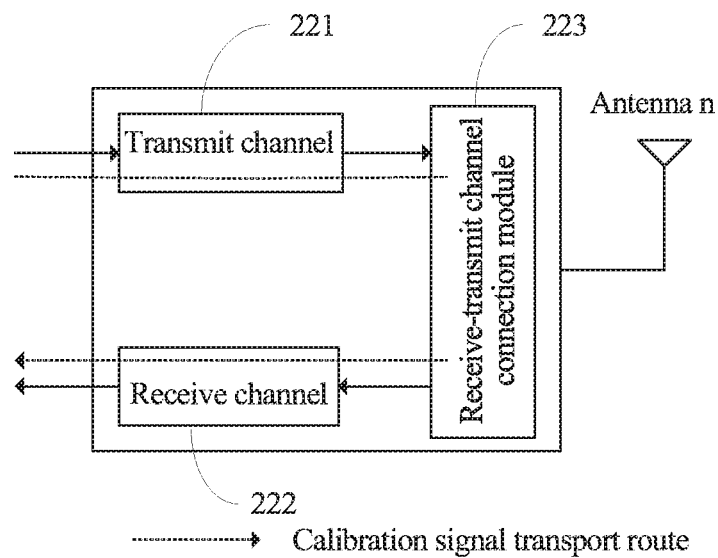
FIG. 4 is a schematic diagram of an implementation manner of detecting a self-loopback response by a channel calibration apparatus according to this application.

Referring to FIG. 4, FIG. 4 is a schematic diagram of an implementation manner of detecting a self-loopback response by a channel calibration apparatus according to this application. Herein, self-loopback responses of a to-be-calibrated antenna, a reference antenna, and a calibration antenna need to be obtained. For example, for the to-be-calibrated antenna, a receive-transmit channel connection module 223 is controlled to directly connect a transmit channel 221 of the to-be-calibrated antenna to a receive channel 222 of the to-be-calibrated antenna. For example, the receive-transmit channel connection module 223 is controlled to include a switch, and the transmit channel 221 of the to-be-calibrated antenna is directly connected to the receive channel 222 of the to-be-calibrated antenna by using the switch. Therefore, a calibration signal sent by the transmit channel 221 of the to-be-calibrated antenna is received by the receive channel 222 of the to-be-calibrated antenna. A processing module 230 compares a calibration signal received by the receive channel 222 with the calibration signal before sending by the transmit channel 221, so that the self-loopback response of the to-be-calibrated antenna is obtained. The processing module 230 may further obtain the self-loopback response of the reference antenna and the self-loopback response of the calibration antenna in a similar manner.

Figure 5:
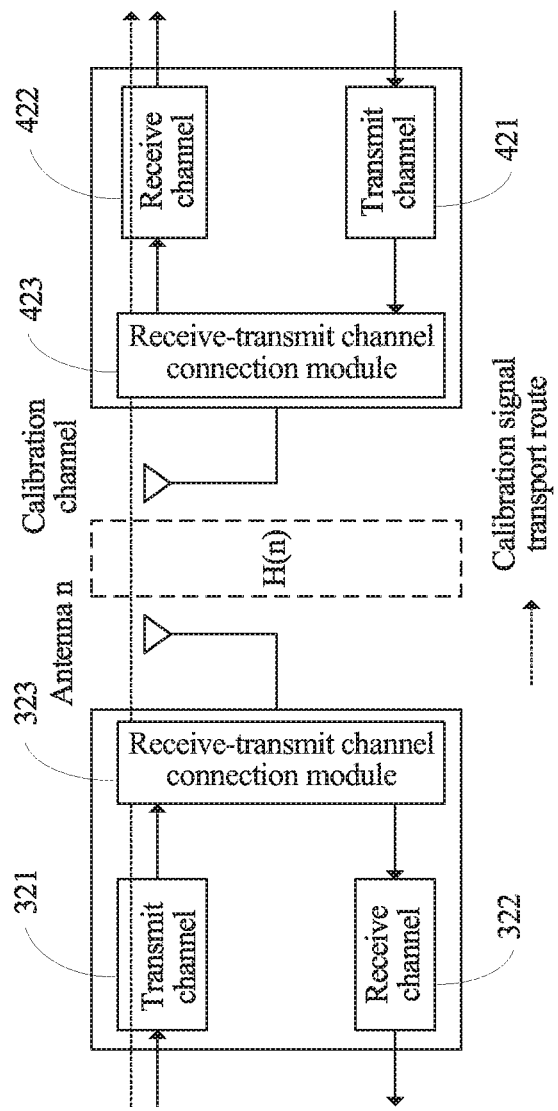
FIG. 5 is a schematic diagram of an implementation manner of detecting a transmission response by a channel calibration apparatus according to this application.

Referring to FIG. 5, FIG. 5 is a schematic diagram of an implementation manner of detecting a transmission response of a to-be-calibrated antenna or a reference antenna by a channel calibration apparatus according to this application. Herein, the transmission response of the to-be-calibrated antenna or the reference antenna needs to be obtained. The to-be-calibrated antenna is used as an example. A processing module 230 controls a transmit channel 321 of the to-be-calibrated antenna, so that the transmit channel 321 of the to-be-calibrated antenna is in a connected state; and controls a receive channel 322 of the to-be-calibrated antenna, so that the receive channel 322 of the to-be-calibrated antenna is in a disconnected state. In addition, the processing module 230 controls a transmit channel 421 of a calibration antenna, so that the transmit channel 421 of the calibration antenna is in a disconnected state; and controls a receive channel 422 of the calibration antenna, so that the receive channel 422 of the calibration antenna is in a connected state. Both a receive-transmit channel connection module 323 of the to-be-calibrated antenna and a receive-transmit channel connection module 423 of the calibration antenna are in a non-operating state. Then, the to-be-calibrated antenna transmits a calibration signal by using the transmit channel 321, and the transmitted calibration signal is received by the receive channel 422 of the calibration antenna. The processing module 230 compares a calibration signal received by the receive channel 422 with the calibration signal before sending by the transmit channel 321, so that the transmission response of the to-be-calibrated antenna is obtained. The transmission response of the to-be-calibrated antenna includes a transmit channel response and a transport channel response that are of the to-be-calibrated antenna, and a receive channel response of the calibration antenna. The processing module 230 may further obtain the transmission response of the reference antenna in a similar manner. The transmission response of the reference antenna includes a transmit channel response and a transport channel response that are of the reference antenna, and a receive channel response of the calibration antenna. Generally, the receive channel response of the calibration antenna and the transport channel response that are included in the transmission response of the reference antenna are different from the receive channel response of the calibration antenna and the transport channel response that are included in the transmission response of the calibration antenna.

Figure 6:
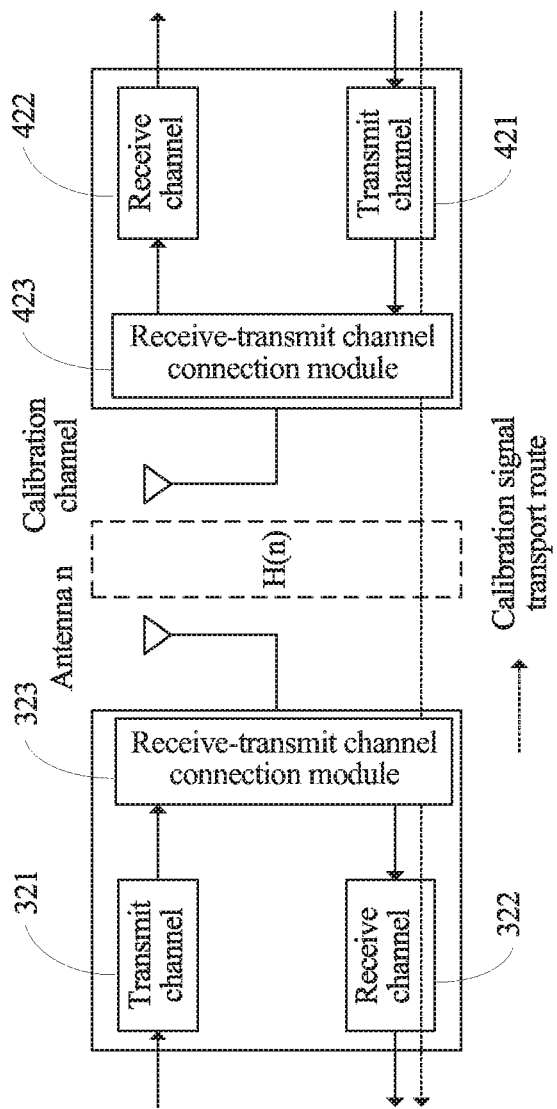
FIG. 6 is a schematic diagram of an implementation manner of detecting a receiving response by a channel calibration apparatus according to this application.

Referring to FIG. 6, FIG. 6 is a schematic diagram of an implementation manner of detecting a receiving response by a channel calibration apparatus according to this application. Herein, a receiving response of a to-be-calibrated antenna or a reference antenna needs to be obtained. The to-be-calibrated antenna is used as an example. A processing module 230 controls a transmit channel 321 of the to-be-calibrated antenna, so that the transmit channel 321 of the to-be-calibrated antenna is in a disconnected state; and controls a receive channel 322 of the to-be-calibrated antenna, so that the receive channel 322 of the to-be-calibrated antenna is in a connected state. In addition, the processing module 230 controls a transmit channel 421 of a calibration antenna, so that the transmit channel 421 of the calibration antenna is in a connected state; and controls a receive channel 422 of the calibration antenna, so that the receive channel 422 of the calibration antenna is in a disconnected state. Both a receive-transmit channel connection module 323 of the to-be-calibrated antenna and a receive-transmit channel connection module 423 of the calibration antenna are in a non-operating state. Then, the calibration antenna transmits a calibration signal by using the transmit channel 421, and the transmitted calibration signal is received by the receive channel 322 of the to-be-calibrated antenna. The processing module 230 compares a received calibration signal with the calibration signal before sending, so that the receiving response of the to-be-calibrated antenna is obtained. The receiving response of the to-be-calibrated antenna includes a transmit channel response of the calibration antenna, a transport channel response, and a receive channel response of the to-be-calibrated antenna or the reference antenna. The processing module 230 may further obtain the receiving response of the reference antenna in a similar manner. The receiving response of the reference antenna includes a transmit channel response of the calibration antenna, a transport channel response, and a receive channel response of the reference antenna. Generally, the transmit channel response of the calibration antenna and the transport channel response that are included in the receiving response of the reference antenna are different from the transmit channel response of the calibration antenna and the transport channel response that are included in the receiving response of the calibration antenna.

After acquiring a self-loopback response of the to-be-calibrated antenna, a self-loopback response of the reference antenna, a self-loopback response of the calibration antenna, a transmission response and the receiving response that are of the to-be-calibrated antenna, and a transmission response and the receiving response that are of the reference antenna, the processing module 230 cancels the transport channel response from each of the transmission response and the receiving response that are of the to-be-calibrated antenna, so as to obtain a transmission response and a receiving response that are of the to-be-calibrated antenna and obtained after processing.

First, the transport channel response may be obtained by calculation according to the self-loopback response, the transmission response, and the receiving response that are of the to-be-calibrated antenna or the reference antenna. For example, a transport channel response H(n) is:

$$H(n)=[(H_T(n)H_R(n))/(H_{CYC}(n)*H_{CYC}(M))]^{1/2}.$$

The to-be-calibrated antenna and the reference antenna are numbered together, where n is a sequence number of a to-be-calibrated antenna or a reference antenna, n is a positive integer less than or equal to N, N is a total quantity of to-be-calibrated antennas and reference antennas, M is a sequence number of a calibration antenna, M is a positive integer, $H_T(n)$ is a transmission response of the antenna whose sequence number is n, $H_R(n)$ is a receiving response of the antenna whose sequence number is n, $H_{CYC}(n)$ is a self-loopback response of the antenna whose sequence number is n, and $H_{CYC}(M)$ is a self-loopback response that is of the calibration antenna whose sequence number is M and obtained after processing.

Then, (1) after both the transmission response and the transport channel response that are of the antenna whose sequence number is n are obtained, the transport channel response is canceled, according to a formula:

$$H_T(n)'=H_T(n)/H(n)=TX(n)*RX(M),$$

from the transmission response of the antenna whose sequence number is n. The to-be-calibrated antenna and the reference antenna are numbered together, where n is the sequence number of the to-be-calibrated antenna or the reference antenna, n is a positive integer less than or equal to N, N is the total quantity of to-be-calibrated antennas and reference antennas, $H_T(n)'$ is a transmission response that is of the antenna whose sequence number is n and obtained after processing, $H_T(n)$ is the transmission response of the antenna whose sequence number is n:

$$H_T(n)=TX(n)*H(n)*RX(M),$$

TX(n) is a transmit channel response of the antenna whose sequence number is n, M is the sequence number of the calibration antenna, and RX(M) is a receive channel response of the calibration antenna whose sequence number is M. Because:

$$H_T(n)=TX(n)*H(n)*RX(M),$$

after:

$$H_T(n)/H(n),$$

that is, after the transport channel response is canceled from the transmission response of the antenna whose sequence number is n, only the transmit channel response TX(n) of the antenna whose sequence number is n and the receive channel response RX(M) of the calibration antenna whose sequence number is M remain and are used as the transmission response obtained after processing. (2) After both the receiving response and the transport channel response that are of the antenna whose sequence number is n are obtained, the transport channel response is then canceled, according to a formula:

$$H_R(n)'=H_R(n)/H(n)=RX(n)*TX(M),$$

from the receiving response of the antenna whose sequence number is n, where n is the sequence number of the to-be-calibrated antenna or the reference antenna, n is a positive integer less than or equal to N, N is the total quantity of to-be-calibrated antennas and reference antennas, $H_R(n)'$ is a receiving response that is of the antenna whose sequence number is n and obtained after processing, $H_R(n)$ is the receiving response of the antenna whose sequence number is u:

$$H_R(n)=RX(n)*H(n)*TX(M),$$

RX(n), is a receive channel response of the antenna whose sequence number is n, M is the sequence number of the calibration antenna, M is a positive integer, and TX(M) is a transmit channel response of the calibration antenna whose sequence number is M. Because:

$$H_R(n)=RX(n)*H(n)*TX(M),$$

after:

$$H_R(n)/H(n),$$

that is, after the transport channel response is canceled from the receiving response of the antenna whose sequence number is n, only the receive channel response RX(n) of the antenna whose sequence number is n and the transmit channel response TX(M) of the calibration antenna whose sequence number is M remain and are used as the receiving response obtained after processing.

After the transport channel response is canceled, the processing module 230 obtains a transmit channel compensation response of the to-be-calibrated antenna according to a transmission response that is of the reference antenna and obtained after processing and the transmission response that is of the to-be-calibrated antenna and obtained after processing, and makes compensation for the transmit channel of the to-be-calibrated antenna according to the transmit channel compensation response; obtains a receive channel compensation response of the to-be-calibrated antenna according to a receiving response that is of the reference antenna and obtained after processing and the receiving response that is of the to-be-calibrated antenna and obtained after processing, and makes compensation for the receive channel of the to-be-calibrated antenna according to the receive channel compensation response. Details are as follows:

(1) The transmit channel compensation response of the to-be-calibrated antenna is obtained according to a formula:

$$H_{TXC}(a)=H_T(b)'/H_T(a)',$$

where a is a sequence number of a to-be-calibrated antenna, b is a sequence number of a reference antenna, a+b=N, a is a positive integer less than N, b is a positive integer less than N, N is the total quantity of to-be-calibrated antennas and reference antennas, $H_{TXC}(a)$ is a transmit channel compensation response of the to-be-calibrated antenna whose sequence number is a, $H_T(b)$ is a transmission response that is of the reference antenna whose sequence number is b and obtained after processing, and $H_T(a)$ is a transmission response that is of the to-be-calibrated antenna whose sequence number is a and obtained after processing. When the to-be-calibrated antenna whose sequence number is a and that is calibrated transmits a signal, a transmit channel response is TX(a), and after the transmit channel response is multiplied by the transmit channel compensation response of the channel:

$$TX(a)*H_{TXC}(a)=TX(b).$$

That is, after compensation is made for each to-be-calibrated antenna, each to-be-calibrated antenna transmits a signal by using a response that is the same as that of a reference antenna, so that calibration of a transmit channel of each to-be-calibrated antenna is completed.

(2) The receive channel compensation response of the to-be-calibrated antenna is obtained according to a formula:

$$H_{RXC}(a)=H_R(b)'/H_R(a)',$$

where a is the sequence number of the to-be-calibrated antenna, b is the sequence number of the reference antenna, a+b=N, a is a positive integer less than N, b is a positive integer less than N, N is the total quantity of to-be-calibrated antennas and reference antennas, $H_{RXC}(a)$ is a receive channel compensation response of the to-be-calibrated antenna whose sequence number is a, $H_R(b)'$ is a receiving response that is of the reference antenna whose sequence number is b and obtained after processing, and $H_R(a)'$ is a receiving response that is of the to-be-calibrated antenna whose sequence number is a and obtained after processing. When the to-be-calibrated antenna whose sequence number is a and that is calibrated receives a signal, a receive channel response is RX(a), and after the receive channel response is multiplied by the receive channel compensation response of the channel:

$$RX(a)*H_{RXC}(a)=RX(b).$$

That is, after compensation is made for each to-be-calibrated antenna, each to-be-calibrated antenna receives a signal by using a response that is the same as that of a reference antenna, so that calibration of a receive channel of each to-be-calibrated antenna is completed.

After calibration of each to-be-calibrated antenna is completed, if the calibration antenna only needs to be used as a calibration antenna, and does not need to be used for data transmission, the calibration antenna does not need to be calibrated. However, if the calibration antenna further needs to be used for data transmission, the calibration antenna needs to be calibrated. When the calibration antenna is being calibrated, a to-be-calibrated antenna that is calibrated is selected as a new reference antenna, another to-be-calibrated antenna that is calibrated is then selected as a new calibration antenna, the original calibration antenna is used as a to-be-calibrated antenna, and the original calibration antenna is calibrated in a manner that is the same as the foregoing manner.

It may be understood that in this application, a signal may be sent from a transmit channel of an antenna to a receive channel of another antenna by using a physical channel (such as a coupling disk), or a signal may be sent from a transmit channel of an antenna to a receive channel of another antenna in a wireless manner. When the wireless manner is used, it can be avoided that a volume of a device is occupied when a manner of a coupling disk is used. When a quantity of antennas is larger, effects are more apparent.

If the apparatus uses a physical channel (such as a coupling disk), alternatively, when calibration is being performed, a transmit channel and a receive channel may be used as a calibration channel instead of using a calibration antenna. That is, when a transmit channel is being calibrated, a signal transmitted by a transmit channel of a reference antenna or a to-be-calibrated antenna is directly transported to a receive channel of a calibration channel by using a physical channel, and no calibration antenna needs to be passed through; when a receive channel is being calibrated, a signal transmitted by a transmit channel of a calibration channel is directly transported to a receive channel of a reference antenna or a to-be-calibrated antenna by using a physical channel, and no calibration antenna needs to be passed through.

In the previous implementation manner, calibration can be implemented provided that a solution to the self-loopback response $H_{CYC}(M)$ of the calibration antenna is found. However, actually, the previous implementation manner may also be transformed, and in this case, calibration can be implemented without finding the solution to the self-loopback response $H_{CYC}(M)$ of the calibration antenna. In transformation of the embodiment, alternatively, the processing module 230 may find a solution to a transport channel response $H(n)$ according to:

$$H(n)=[(H_T(n)H_R(n))/H_{CYC}(n)]^{1/2},$$

where n is a sequence number of a to-be-calibrated antenna or a reference antenna, n is a positive integer less than or equal to N, N is a total quantity of to-be-calibrated antennas and reference antennas:

$$H_T(n)=TX(n)*H(n)*RX(M),$$

is a transmission response of an antenna whose sequence number is n, TX(n) is a transmit channel response of the antenna whose sequence number is n, M is a sequence number of a calibration antenna, M is a positive integer, RX(M) is a receive channel response of the calibration antenna whose sequence number is M:

$$H_R(n)=RX(n)*H(n)*TX(M),$$

is a receiving response of the antenna whose sequence number is n:

$$H_{CYC}(n)=TX(n)*RX(n),$$

is a self-loopback response of the antenna whose sequence number is n, RX(n) is a receive channel response of the antenna whose sequence number is n, and TX(M) is a transmit channel response of the calibration antenna whose sequence number is M.

Then, after the transport channel response $H(n)$ is obtained, (1) the processing module 230 cancels, according to a formula:

$$H_T(n)'=H_T(n)/H(n)=TX(n)*\{[RX(M)/TX(M)]^{1/2}\},$$

the transport channel response from the transmission response of the antenna whose sequence number is n, where n is the sequence number of the to-be-calibrated antenna or the reference antenna, n is a positive integer less than or equal to N, N is the total quantity of to-be-calibrated antennas and reference antennas, $H_T(n)'$ is a transmission response that is of the antenna whose sequence number is n and obtained after processing, $H_T(n)$ is the transmission response of the antenna whose sequence number is n, and:

$$H_T(n)=TX(n)*H(n)*RX(M).$$

(2) The processing module 230 cancels, according to a formula:

$$H_R(n)'=H_R(n)/H(n)=RX(n)*\{[TX(M)/RX(M)]^{1/2}\},$$

the transport channel response from the receiving response of the antenna whose sequence number is n, where n is the sequence number of the to-be-calibrated antenna or the reference antenna, n is a positive integer less than or equal to N, N is the total quantity of to-be-calibrated antennas and reference antennas, $H_R(n)'$ is a receiving response that is of the antenna whose sequence number is n and obtained after processing, $H_R(n)$ is the receiving response of the antenna whose sequence number is n, and:

$$H_R(n)=RX(n)*H(n)*TX(M).$$

Afterward, (1) a transmit channel compensation response of the to-be-calibrated antenna is obtained according to a formula:

$$H_{TXC}(a)=H_T(b)'/H_T(a)',$$

where a is a sequence number of a to-be-calibrated antenna, b is a sequence number of a reference antenna, a+b=N, a is a positive integer less than N, b is a positive integer less than N, N is the total quantity of to-be-calibrated antennas and reference antennas, $H_{TXC}(a)$ is a transmit channel compensation response of the to-be-calibrated antenna whose sequence number is a, $H_T(b)'$ is a transmission response that is of the reference antenna whose sequence number is b and obtained after processing, and $H_T(a)'$ is a transmission response that is of the to-be-calibrated antenna whose sequence number is a and obtained after processing. Although the factor:

$$\{[RX(M)/TX(M)]^{1/2}\},$$

still remains in the transmission responses obtained after processing, during calculation for the compensation response:

$$H_{TXC}(a) = H_T(b)'/H_T(a)' = \frac{TX(b)*\{[RX(M)/TX(M)]^{1/2}\}}{TX(a)*\{[RX(M)/TX(M)]^{1/2}\}} = \frac{TX(b)}{TX(a)};$$

where the factor:

$$\{[Rx(M)/TX(M)]^{1/2}\},$$

may be canceled. Therefore, although the factor:

$$\{[Rx(M)/TX(M)]^{1/2}\},$$

still remains in the transmission responses obtained after processing, a final result is not affected.

When the to-be-calibrated antenna whose sequence number is a and that is calibrated transmits a signal, a transmit channel response is TX(a), and after the transmit channel response is multiplied by the transmit channel compensation response of the channel:

$$TX(a)*H_{TXC}(a)=TX(b).$$

That is, after compensation is made for each to-be-calibrated antenna, each to-be-calibrated antenna transmits a signal by using a response that is the same as that of a reference antenna, so that calibration of a transmit channel of each to-be-calibrated antenna is completed.

(2) A receive channel compensation response of the to-be-calibrated antenna is obtained according to a formula:

$$H_{RXC}(a)=H_R(b)'/H_R(a)',$$

where a is the sequence number of the to-be-calibrated antenna, b is the sequence number of the reference antenna, a is a positive integer less than N, b is a positive integer less than N, N is the total quantity of to-be-calibrated antennas and reference antennas, $H_{RXC}(a)$ is a receive channel compensation response of the to-be-calibrated antenna whose sequence number is a, $H_T(b)'$ is a receiving response that is of the reference antenna whose sequence number is b and obtained after processing, and $H_T(a)'$ is a receiving response that is of the to-be-calibrated antenna whose sequence number is a and obtained after processing. Although the factor:

$$\{[TX(M)/RX(M)]^{1/2}\},$$

still remains in the receiving responses obtained after processing, during calculation for the compensation response:

$$H_{RXC}(a) = H_R(b)'/H_R(a)' = \frac{RX(b)*\{[TX(M)/RX(M)]^{1/2}\}}{RX(a)*\{[TX(M)/RX(M)]^{1/2}\}} = \frac{RX(b)}{RX(a)};$$

where the factor:

$$\{[TX(M)/RX(M)]^{1/2}\},$$

may be canceled. Therefore, although the factor:

$$\{[TX(M)/RX(M)]^{1/2}\}$$

still remains in the receiving responses obtained after processing, a final result is not affected.

When the to-be-calibrated antenna whose sequence number is a and that is calibrated receives a signal, a receive channel response is RX(a), and after the receive channel response is multiplied by the receive channel compensation response of the channel:

$$RX(a)*H_{RXC}(a)=RX(b).$$

That is, after compensation is made for each to-be-calibrated antenna, each to-be-calibrated antenna receives a signal by using a response that is the same as that of a reference antenna, so that calibration of a receive channel of each to-be-calibrated antenna is completed.

It may be learned from the foregoing that although a calculation process is different in a manner obtained after transformation, transmit channel compensation responses and receive channel compensation responses finally obtained by calculation are identical.

In this implementation manner, transport channel responses are obtained according to self-loopback responses, transmission responses, and receiving responses of a to-be-calibrated antenna and a reference antenna; the transport channel responses are canceled from the transmission responses and the receiving responses of the to-be-calibrated antenna and the reference antenna to obtain new transmission responses and new receiving responses; then a transmit channel compensation response and a receive channel compensation response are obtained according to the new transmission responses and the new receiving responses; then compensation is made respectively for a transmit channel and a receive channel according to the transmit channel compensation response and the receive channel compensation response, so that calibration of the antenna is implemented. In this application, a transport channel response is canceled from a transmission response and a receiving response, which can avoid that the transport channel response is brought into compensation; therefore, an error caused by inconsistency among transport channel responses can be corrected, and calibration precision is improved.

In addition, in an embodiment, an error caused by inconsistency among transport channel responses is corrected by using an algorithm, and a chip in the prior art has a quite high calculation capability and is cost-effective; therefore, inconsistency among transport channel responses can be corrected very easily, and costs are reduced.

Figure 7:
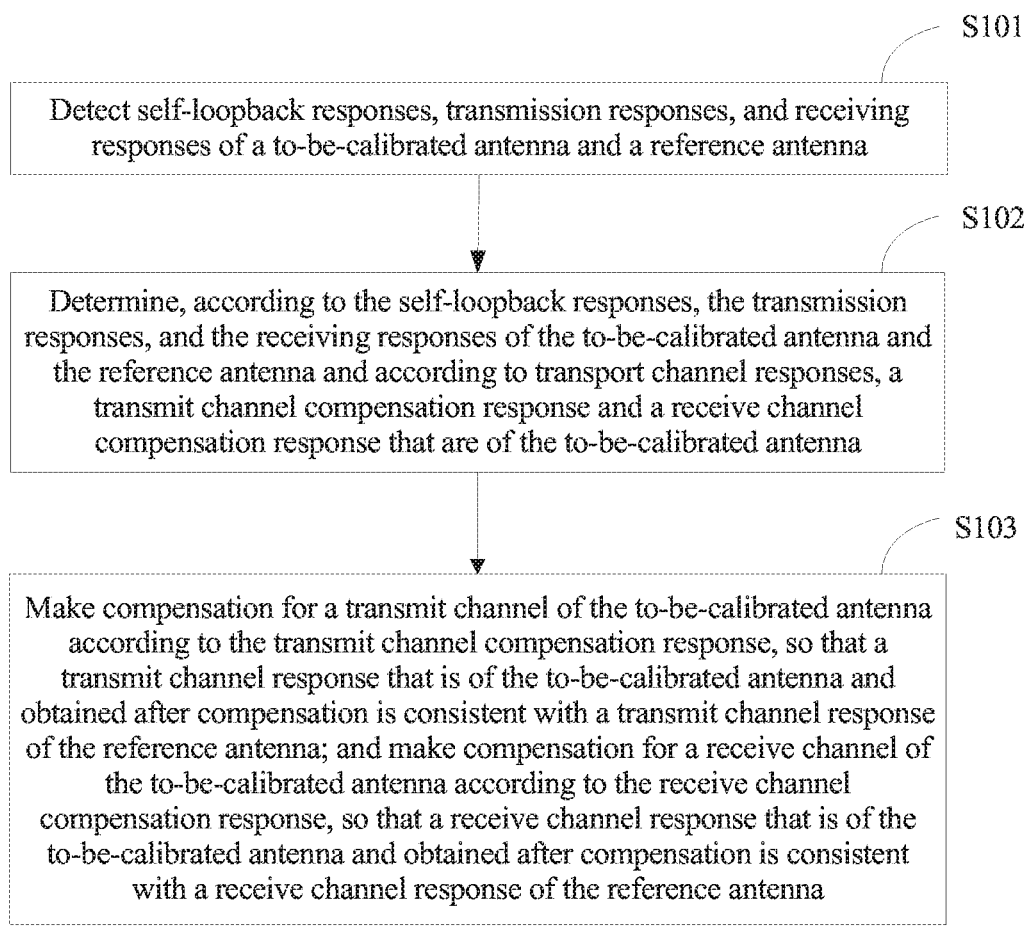
FIG. 7 is a flowchart of an implementation manner of a channel calibration method according to this application.

Referring to FIG. 7, FIG. 7 is a flowchart of an implementation manner of a channel calibration method according to this application. This implementation manner includes the following steps:

S101. Detect self-loopback responses, transmission responses, and receiving responses of a to-be-calibrated antenna and a reference antenna. The self-loopback response of the to-be-calibrated antenna is a ratio of a signal sent by a transmit channel of the to-be-calibrated antenna to a signal received by a receive channel of the to-be-calibrated antenna when the signal sent by the transmit channel of the to-be-calibrated antenna is received by the receive channel of the to-be-calibrated antenna; the transmission response of the to-be-calibrated antenna is a ratio of a signal sent by a transmit channel of the to-be-calibrated antenna to a signal received by a receive channel of a calibration channel when the signal sent by the transmit channel of the to-be-calibrated antenna is received by the receive channel of the calibration channel; the receiving response of the to-be-calibrated antenna is a ratio of a signal sent by a transmit channel of a calibration channel to a signal received by a receive channel of the to-be-calibrated antenna when the signal sent by the transmit channel of the calibration channel is received by the receive channel of the to-be-calibrated antenna; the self-loopback response of the reference antenna is a ratio of a signal sent by a transmit channel of the reference antenna to a signal received by a receive channel of the reference antenna when the signal sent by the transmit channel of the reference antenna is received by the receive channel of the reference antenna; the transmission response of the reference antenna is a ratio of a signal sent by a transmit channel of the reference antenna to a signal received by a receive channel of a calibration channel when the signal sent by the transmit channel of the reference antenna is received by the receive channel of the calibration channel; the receiving response of the reference antenna is a ratio of a signal sent by a transmit channel of a calibration channel to a signal received by a receive channel of the reference antenna when the signal sent by the transmit channel of the calibration channel is received by the receive channel of the reference antenna.

S102. Determine, according to the transmission responses, and the receiving responses of the to-be-calibrated antenna and the reference antenna and according to transport channel responses, transmission responses and receiving responses that are of the to-be-calibrated antenna and the reference antenna and obtained after processing; and then determine, according to the transmission responses and the receiving responses that are of the to-be-calibrated antenna and the reference antenna and obtained after processing, a transmit channel compensation response and a receive channel compensation response that are of the to-be-calibrated antenna.

S103. Make compensation for the transmit channel of the to-be-calibrated antenna according to the transmit channel compensation response, so that a transmit channel response that is of the to-be-calibrated antenna and obtained after compensation is consistent with a transmit channel response of the reference antenna; and make compensation for the receive channel of the to-be-calibrated antenna according to the receive channel compensation response, so that a receive channel response that is of the to-be-calibrated antenna and obtained after compensation is consistent with a receive channel response of the reference antenna.

In this implementation manner, transport channel responses are obtained according to self-loopback responses, transmission responses, and receiving responses of a to-be-calibrated antenna and a reference antenna; the transport channel responses are canceled from the transmission responses and the receiving responses of the to-be-calibrated antenna and the reference antenna to obtain new transmission responses and new receiving responses; then a transmit channel compensation response and a receive channel compensation response are obtained according to the new transmission responses and the new receiving responses; then compensation is made respectively for a transmit channel and a receive channel according to the transmit channel compensation response and the receive channel compensation response, so that calibration of the antenna is implemented. In this application, a transport channel response is canceled from a transmission response and a receiving response, which can avoid that the transport channel response is brought into compensation; therefore, an error caused by inconsistency among transport channel responses can be corrected, and calibration precision is improved.

Figure 8:
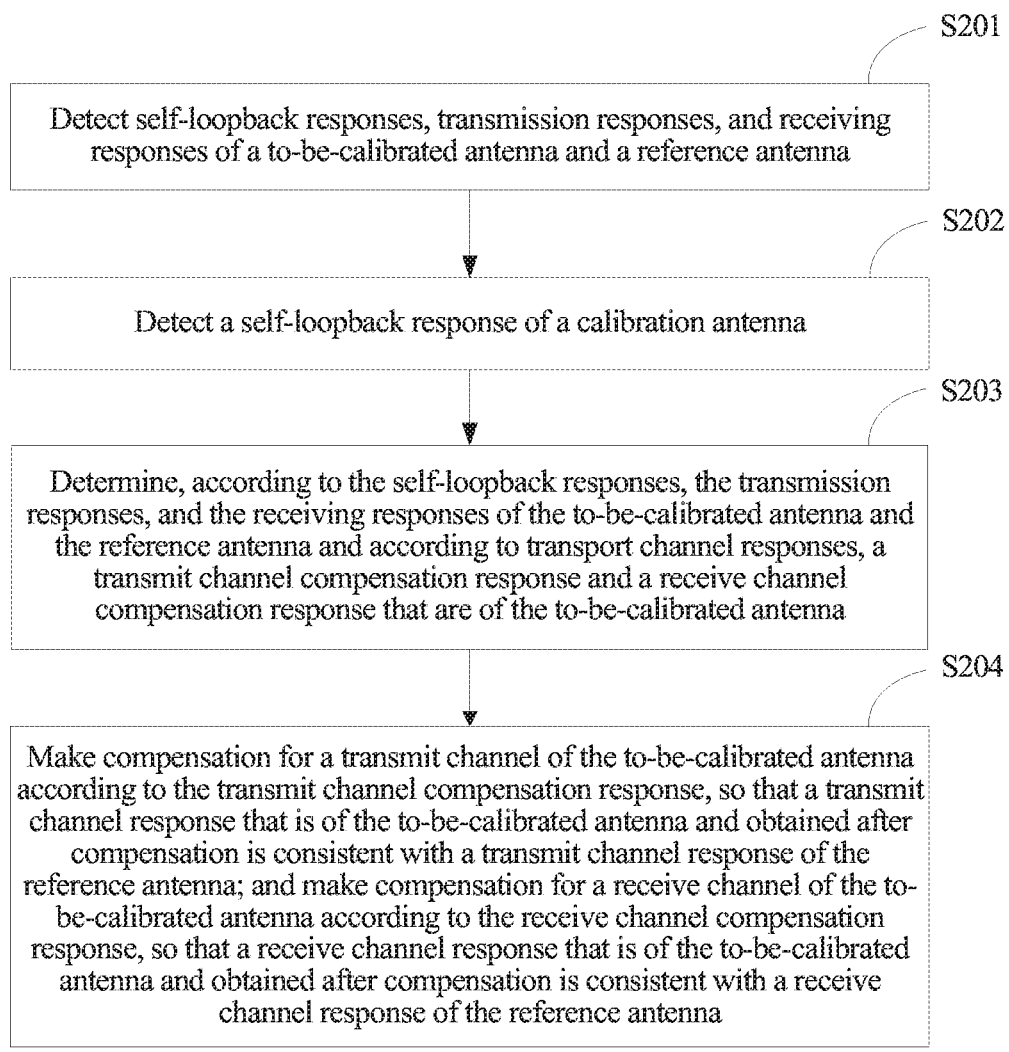
FIG. 8 is a flowchart of another implementation manner of a channel calibration method according to this application.

Referring to FIG. 8, FIG. 8 is a flowchart of another implementation manner of a channel calibration method according to this application. This implementation manner includes the following steps:

S201. Detect self-loopback responses, transmission responses, and receiving responses of a to-be-calibrated antenna and a reference antenna. The self-loopback response of the to-be-calibrated antenna is a ratio of a signal sent by a transmit channel of the to-be-calibrated antenna to a signal received by a receive channel of the to-be-calibrated antenna when the signal sent by the transmit channel of the to-be-calibrated antenna is received by the receive channel of the to-be-calibrated antenna; the transmission response of the to-be-calibrated antenna is a ratio of a signal sent by a transmit channel of the to-be-calibrated antenna to a signal received by a receive channel of a calibration channel when the signal sent by the transmit channel of the to-be-calibrated antenna is received by the receive channel of the calibration channel; the receiving response of the to-be-calibrated antenna is a ratio of a signal sent by a transmit channel of a calibration channel to a signal received by a receive channel of the to-be-calibrated antenna when the signal sent by the transmit channel of the calibration channel is received by the receive channel of the to-be-calibrated antenna; the self-loopback response of the reference antenna is a ratio of a signal sent by a transmit channel of the reference antenna to a signal received by a receive channel of the reference antenna when the signal sent by the transmit channel of the reference antenna is received by the receive channel of the reference antenna; the transmission response of the reference antenna is a ratio of a signal sent by a transmit channel of the reference antenna to a signal received by a receive channel of a calibration channel when the signal sent by the transmit channel of the reference antenna is received by the receive channel of the calibration channel; the receiving response of the reference antenna is a ratio of a signal sent by a transmit channel of a calibration channel to a signal received by a receive channel of the reference antenna when the signal sent by the transmit channel of the calibration channel is received by the receive channel of the reference antenna.

When the self-loopback response of the to-be-calibrated antenna is being detected, the transmit channel of the to-be-calibrated antenna is connected to the receive channel of the to-be-calibrated antenna. Therefore, a calibration signal sent by the to-be-calibrated antenna by using the transmit channel of the to-be-calibrated antenna is received by the receive channel of the to-be-calibrated antenna. Then, a received calibration signal is compared with the calibration signal before sending, so that the self-loopback response of the to-be-calibrated antenna is obtained. Similarly, the self-loopback response of the reference antenna may be obtained.

When the transmission response of the to-be-calibrated antenna is being detected, the to-be-calibrated antenna is made to send a calibration signal to a receive channel of a calibration antenna by using the transmit channel. Therefore, the calibration signal sent by the to-be-calibrated antenna by using the transmit channel is received by the receive channel of the calibration antenna. Then, a received calibration signal is compared with the calibration signal before sending, so that the transmission response of the to-be-calibrated antenna is obtained. Similarly, the transmission response of the reference antenna may be obtained.

When the receiving response of the to-be-calibrated antenna is being detected, the calibration antenna is made to send a calibration signal to the receive channel of the to-be-calibrated antenna by using the transmit channel. Therefore, the calibration signal sent by the calibration antenna by using the transmit channel is received by the receive channel of the to-be-calibrated antenna. Then, a received calibration signal is compared with the calibration signal before sending, so that the receiving response of the to-be-calibrated antenna is obtained. Similarly, the receiving response of the reference antenna may be obtained.

S202. Detect a self-loopback response of a calibration channel. The self-loopback response of the calibration channel is a ratio of a signal sent by a transmit channel of the calibration channel to a signal received by a receive channel of the calibration channel when the signal sent by the transmit channel of the calibration channel is received by the receive channel of the calibration channel.

The transmit channel of the calibration antenna is connected to the receive channel of the calibration antenna. Therefore, a calibration signal sent by the calibration antenna by using the transmit channel of the calibration antenna is received by the receive channel of the calibration antenna. Then, a received calibration signal is compared with the calibration signal before sending, so that the self-loopback response of the calibration antenna is obtained.

S203. Determine, according to the transmission responses, and the receiving responses of the to-be-calibrated antenna and the reference antenna and according to transport channel responses, transmission responses and receiving responses that are of the to-be-calibrated antenna and the reference antenna and obtained after processing; and then determine, according to the transmission responses and the receiving responses that are of the to-be-calibrated antenna and the reference antenna and obtained after processing, a transmit channel compensation response and a receive channel compensation response that are of the to-be-calibrated antenna.

After the self-loopback responses, the transmission responses, and the receiving responses of the to-be-calibrated antenna and the reference antenna and the self-loopback response of the calibration antenna are obtained by detection, the transport channel responses may be obtained by calculation according to the transmission responses, and the receiving responses of the to-be-calibrated antenna and the reference antenna and the self-loopback response of the calibration antenna.

For example, a transport channel response H(n) is:

$$H(n)=[(H_T(n)H_R(n))/(H_{CYC}(n)*H_{CYC}(M))]^{1/2},$$

where n is a sequence number of an antenna, n is a positive integer less than or equal to N, N is a total quantity of to-be-calibrated antennas and reference antennas, $H_T(n)$ is a transmission response of the antenna whose sequence number is n, $H_R(n)$ is a receiving response of the antenna whose sequence number is n, $H_{CYC}(n)$ is a self-loopback response of the antenna whose sequence number is n, M is a sequence number of a calibration antenna, and $H_{CYC}(M)$ is a self-loopback response of the calibration antenna whose sequence number is M.

Then, (1) after both the transmission response and the transport channel response that are of the antenna whose sequence number is n are obtained, the transport channel response is canceled, according to a formula:

$$H_T(n)'=H_T(n)/H(n)=TX(n)*RX(M),$$

from the transmission response of the antenna whose sequence number is n, where n is the sequence number of the antenna, n is a positive integer less than or equal to N, N is the total quantity of to-be-calibrated antennas and reference antennas, $H_T(n)$ is a transmission response that is of the antenna whose sequence number is n and obtained after processing, $H_T(n)$ is the transmission of the antenna whose sequence number is n:

$$H_T(n)=TX(n)*H(n)*RX(M),$$

TX(n), is a transmit channel response of the antenna whose sequence number is n, M is the sequence number of the calibration antenna, and RX(M) is a receive channel response of the calibration antenna whose sequence number is M. Because:

$$H_T(n)=TX(n)*H(n)*RX(M),$$

after:

$$H_T(n)/H(n),$$

that is, after the transport channel response is canceled from the transmission response of the antenna whose sequence number is n, only the transmit channel response TX(n) of the antenna whose sequence number is n and the receive channel response RX(M) of the calibration antenna whose sequence number is M remain and are used as the transmission response obtained after processing. (2) After both the receiving response and the transport channel response that are of the antenna whose sequence number is n are obtained, the transport channel response is then canceled from the receiving response of the antenna according to a formula:

$$H_R(n)'=H_R(n)/H(n)=RX(n)*TX(M),$$

where n is a positive integer less than or equal to N, N is the total quantity of to-be-calibrated antennas and reference antennas, $H_R(n)'$ is a receiving response that is of the antenna whose sequence number is n and obtained after processing, $H_R(n)$ is the receiving response of the antenna whose sequence number is:

$$n, H_R(n)=RX(n)*H(n)*TX(M),$$

RX(n), is a receive channel response of the antenna whose sequence number is n, M is the sequence number of the calibration antenna, TX(M) is a transmit channel response of the calibration antenna whose sequence number is M. Because:

$$H_R(n)=RX(n)*H(n)*TX(M),$$

after:

$$H_R(n)/H(n),$$

that is, after the transport channel response is canceled from the receiving response of the antenna whose sequence number is n, only the receive channel response RX(n) of the antenna whose sequence number is n and the transmit channel response TX(M) of the calibration antenna whose sequence number is M remain and are used as the receiving response obtained after processing.

(1) The transmit channel compensation response of the to-be-calibrated antenna is obtained according to a formula:

$$H_{TXC}(a)=H_T(b)'/H_T(a)',$$

where a is a sequence number of a to-be-calibrated antenna, b is a sequence number of a reference antenna, a+b=N, a is a positive integer less than N, b is a positive integer less than N, N is the total quantity of to-be-calibrated antennas and reference antennas, $H_{TXC}(a)$ is a transmit channel compensation response of the to-be-calibrated antenna whose sequence number is a, $H_T(b)'$ is a transmission response that is of the reference antenna whose sequence number is b and obtained after processing, and $H_T(a)'$ is a transmission response that is of the to-be-calibrated antenna whose sequence number is a and obtained after processing. When the to-be-calibrated antenna whose sequence number is a and that is calibrated transmits a signal, a transmit channel response is TX(a), and after the transmit channel response is multiplied by the transmit channel compensation response of the channel:

$$TX(a)*H_{TXC}(a)=TX(b).$$

That is, after compensation is made for each to-be-calibrated antenna, each to-be-calibrated antenna transmits a signal by using a response that is the same as that of a reference antenna, so that calibration of a transmit channel of each to-be-calibrated antenna is completed.

(2) The receive channel compensation response of the to-be-calibrated antenna is obtained according to a formula:

$$H_{RXC}(a)=H_R(b)'/H_R(a)',$$

where a is the sequence number of the to-be-calibrated antenna, b is the sequence number of the reference antenna, a+b=N, a is a positive integer less than N, b is a positive integer less than N, N is the total quantity of to-be-calibrated antennas and reference antennas, $H_{RXC}(a)$ is a receive channel compensation response of the to-be-calibrated antenna whose sequence number is a, $H_R(b)$ is a receiving response that is of the reference antenna whose sequence number is b and obtained after processing, and $H_R(a)$ is a receiving response that is of the to-be-calibrated antenna whose sequence number is a and obtained after processing. When the to-be-calibrated antenna whose sequence number is a and that is calibrated receives a signal, a receive channel response is RX(a), and after the receive channel response is multiplied by the receive channel compensation response of the channel:

$$RX(a)*H_{RXC}(a)=RX(b).$$

That is, after compensation is made for each to-be-calibrated antenna, each to-be-calibrated antenna receives a signal by using a response that is the same as that of a reference antenna, so that calibration of a receive channel of each to-be-calibrated antenna is completed.

After calibration of each to-be-calibrated antenna is completed, if the calibration antenna only needs to be used as a calibration antenna, and does not need to be used for data transmission, the calibration antenna does not need to be calibrated. However, if the calibration antenna further needs to be used for data transmission, the calibration antenna needs to be calibrated. When the calibration antenna is being calibrated, a to-be-calibrated antenna that is calibrated is selected as a new reference antenna, another to-be-calibrated antenna that is calibrated is then selected as a new calibration antenna, the original calibration antenna is used as a to-be-calibrated antenna, and the original calibration antenna is calibrated in a manner that is the same as the foregoing manner.

It may be understood that in this application, a signal may be sent from a transmit channel of an antenna to a receive channel of another antenna by using a physical channel (such as a coupling disk), or a signal may be sent from a transmit channel of an antenna to a receive channel of another antenna in a wireless manner. When the wireless manner is used, it can be avoided that a volume of a device is occupied when a manner of a coupling disk is used. When a quantity of antennas is larger, effects are more apparent.

If an apparatus uses a physical channel (such as a coupling disk), alternatively, when calibration is being performed, a transmit channel and a receive channel may be used as a calibration channel instead of using a calibration antenna. That is, when a transmit channel is being calibrated, a signal transmitted by a transmit channel of a reference antenna or a to-be-calibrated antenna is directly transported to a receive channel of a calibration channel by using a physical channel, and no calibration antenna needs to be passed through; when a receive channel is being calibrated, a signal transmitted by a transmit channel of a calibration channel is directly transported to a receive channel of a reference antenna or a to-be-calibrated antenna by using a physical channel, and no calibration antenna needs to be passed through.

In the previous implementation manner, calibration can be implemented provided that a solution to the self-loopback response $H_{CYC}(M)$ of the calibration antenna is found. However, actually, the previous implementation manner may also be transformed, and in this case, calibration can be implemented without finding the solution to the self-loopback response $H^{CYC}(M)$ of the calibration antenna. In transformation of an embodiment, alternatively, a solution to a transport channel response H(n) may be found according to:

$$H(n)=[(H_T(n)H_R(n))/H_{CYC}(n)]^{1/2},$$

where n is a sequence number of a to-be-calibrated antenna or a reference antenna, n is a positive integer less than or equal to N, N is a total quantity of to-be-calibrated antennas and reference antennas:

$$H_T(n)=TX(n)*H(n)*RX(M),$$

is a transmission response of the antenna whose sequence number is n, TX(n) is a transmit channel response of the antenna whose sequence number is n, M is a sequence number of a calibration antenna, M is a positive integer, RX(M) is a receive channel response of the calibration antenna whose sequence number is M, and:

$$H_R(n)=RX(n)*H(n)*TX(M)$$

is a receiving response of the antenna whose sequence number is n, and:

$$H_{CYC}(n)=TX(n)*RX(n)$$

is a self-loopback response of the antenna whose sequence number is n, RX(n) is a receive channel response of the antenna whose sequence number is n, and TX(M) is a transmit channel response of the calibration antenna whose sequence number is M.

Then, after the transport channel response H(n) is obtained, (1) the transport channel response is canceled, according to a formula:

$$H_T(n)'=H_T(n)/H(n)=TX(n)*\{[RX(M)/TX(M)]^{1/2}\},$$

from the transmission response of the antenna whose sequence number is n, where n is the sequence number of the to-be-calibrated antenna or the reference antenna, n is a positive integer less than or equal to N, N is the total quantity of to-be-calibrated antennas and reference antennas, $H_T(n)$ is a transmission response that is of the antenna whose sequence number is n and obtained after processing, $H_T(n)$ is the transmission response of the antenna whose sequence number is n, and:

$$H_T(n)=TX(n)*H(n)*RX(M).$$

(2) The transport channel response is canceled, according to a formula:

$$H_R(n)'=H_R(n)/H(n)=RX(n)*\{[TX(M)/RX(M)]^{1/2}\},$$

from the receiving response of the antenna whose sequence number is n, where n is the sequence number of the to-be-calibrated antenna or the reference antenna, n is a positive integer less than or equal to N, N is the total quantity of to-be-calibrated antennas and reference antennas, $H_R(n)'$ is a receiving response that is of the antenna whose sequence number is n and obtained after processing, $H_R(n)$ is the receiving response of the antenna whose sequence number is n, and:

$$H_R(n)=RX(n)*H(n)*TX(M).$$

Afterward, (1) the transmit channel compensation response of the to-be-calibrated antenna is obtained according to a formula:

$$H_{TXC}(a)=H_T(b)'/H_T(a)',$$

where a is a sequence number of a to-be-calibrated antenna, b is a sequence number of a reference antenna, a+b=N, a is a positive integer less than N, b is a positive integer less than N, N is the total quantity of to-be-calibrated antennas and reference antennas, $H_{TXC}(a)$ is a transmit channel compensation response of the to-be-calibrated antenna whose sequence number is a, $H_T(b)'$ is a transmission response that is of the reference antenna whose sequence number is b and obtained after processing, and $H_T(a)'$ is a transmission response that is of the to-be-calibrated antenna whose sequence number is a and obtained after processing. Although the factor:

$$\{[RX(M)/TX(M)]^{1/2}\},$$

still remains in the transmission responses obtained after processing, during calculation for the compensation response:

$$H_{TXC}(a) = H_T(b)' / H_T(a)' = \frac{TX(b)*\{[RX(M)/TX(M)]^{1/2}\}}{TX(a)*\{[RX(M)/TX(M)]^{1/2}\}} = \frac{TX(b)}{TX(a)};$$

where the factor:

$$\{[RX(M)/TX(M)]^{1/2}\},$$

may be canceled. Therefore, although the factor:

$$\{[Rx(M)/TX(M)]^{1/2}\},$$

still remains in the transmission responses obtained after processing, a final result is not affected.

When the to-be-calibrated antenna whose sequence number is a and that is calibrated transmits a signal, a transmit channel response is TX(a), and after the transmit channel response is multiplied by the transmit channel compensation response of the channel:

$$TX(a)*H_{TXC}(a)=TX(b).$$

That is, after compensation is made for each to-be-calibrated antenna, each to-be-calibrated antenna transmits a signal by using a response that is the same as that of a reference antenna, so that calibration of a transmit channel of each to-be-calibrated antenna is completed.

(2) The receive channel compensation response of the to-be-calibrated antenna is obtained according to a formula:

$$H_{RXC}(a)=H_R(b)'/H_R(a)',$$

where a is the sequence number of the to-be-calibrated antenna, b is the sequence number of the reference antenna, a is a positive integer less than N, b is a positive integer less than N, N is the total quantity of to-be-calibrated antennas and reference antennas, $H_{RXC}(a)$ is a receive channel compensation response of the to-be-calibrated antenna whose sequence number is a, $H_R(b)'$ is a receiving response that is of the reference antenna whose sequence number is b and obtained after processing, and $H_R(a)'$ is a receiving response that is of the to-be-calibrated antenna whose sequence number is a and obtained after processing. Although the factor:

$$\{[TX(M)/RX(M)]^{1/2}\},$$

still remains in the receiving responses obtained after processing, during calculation for the compensation response:

$$H_{RXC}(a) = H_R(b)' / H_R(a)' = \frac{RX(b)*\{[TX(M)/RX(M)]^{1/2}\}}{RX(a)*\{[TX(M)/RX(M)]^{1/2}\}} = \frac{RX(b)}{RX(a)};$$

where the factor:

$$\{[TX(M)/RX(M)]^{1/2}\},$$

may be canceled. Therefore, although the factor:

$$\{[X(M)/RX(M)]^{1/2}\}$$

still remains in the receiving responses obtained after processing, a final result is not affected.

When the to-be-calibrated antenna whose sequence number is a and that is calibrated receives a signal, a receive channel response is RX(a), and after the receive channel response is multiplied by the receive channel compensation response of the channel:

$$RX(a)*H_{RXC}(a)=RX(b).$$

That is, after compensation is made for each to-be-calibrated antenna, each to-be-calibrated antenna receives a signal by using a response that is the same as that of a reference antenna, so that calibration of a receive channel of each to-be-calibrated antenna is completed.

It may be learned from the foregoing that although a calculation process is different in a manner obtained after transformation, transmit channel compensation responses and receive channel compensation responses finally obtained by calculation are identical.

S204. Make compensation for the transmit channel of the to-be-calibrated antenna according to the transmit channel compensation response, so that a transmit channel response that is of the to-be-calibrated antenna and obtained after compensation is consistent with a transmit channel response of the reference antenna; and make compensation for the receive channel of the to-be-calibrated antenna according to the receive channel compensation response, so that a receive channel response that is of the to-be-calibrated antenna and obtained after compensation is consistent with a receive channel response of the reference antenna.

In this implementation manner, transport channel responses are obtained according to self-loopback responses, transmission responses, and receiving responses of a to-be-calibrated antenna and a reference antenna; the transport channel responses are canceled from the transmission responses and the receiving responses of the to-be-calibrated antenna and the reference antenna to obtain new transmission responses and new receiving responses; then a transmit channel compensation response and a receive channel compensation response are obtained according to the new transmission responses and the new receiving responses; then compensation is made respectively for a transmit channel and a receive channel according to the transmit channel compensation response and the receive channel compensation response, so that calibration of the antenna is implemented. In this application, a transport channel response is canceled from a transmission response and a receiving response, which can avoid that the transport channel response is brought into compensation; therefore, an error caused by inconsistency among transport channel responses can be corrected, and calibration precision is improved.

In addition, in an embodiment, an error caused by inconsistency among transport channel responses is corrected by using an algorithm, and a chip in the prior art has a quite high calculation capability and is cost-effective; therefore, inconsistency among transport channel responses can be corrected very easily, and costs are reduced.

Figure 9:
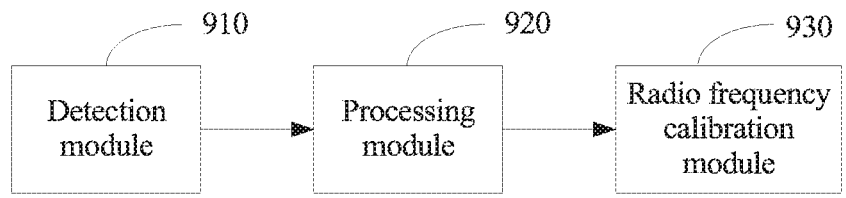
FIG. 9 is a schematic structural diagram of another implementation manner of a channel calibration apparatus according to this application.

Referring to FIG. 9, FIG. 9 is a schematic structural diagram of another implementation manner of a channel calibration apparatus according to this application. The channel calibration apparatus in this implementation manner includes a detection module 910, a processing module 920, and a radio frequency calibration module 930.

The detection module 910 is configured to detect self-loopback responses, transmission responses, and receiving responses of a to-be-calibrated antenna and a reference antenna, where the self-loopback response of the to-be-calibrated antenna is a ratio of a signal sent by a transmit channel of the to-be-calibrated antenna to a signal received by a receive channel of the to-be-calibrated antenna when the signal sent by the transmit channel of the to-be-calibrated antenna is received by the receive channel of the to-be-calibrated antenna; the transmission response of the to-be-calibrated antenna is a ratio of a signal sent by a transmit channel of the to-be-calibrated antenna to a signal received by a receive channel of a calibration channel when the signal sent by the transmit channel of the to-be-calibrated antenna is received by the receive channel of the calibration channel; the receiving response of the to-be-calibrated antenna is a ratio of a signal sent by a transmit channel of a calibration channel to a signal received by a receive channel of the to-be-calibrated antenna when the signal sent by the transmit channel of the calibration channel is received by the receive channel of the to-be-calibrated antenna; the self-loopback response of the reference antenna is a ratio of a signal sent by a transmit channel of the reference antenna to a signal received by a receive channel of the reference antenna when the signal sent by the transmit channel of the reference antenna is received by the receive channel of the reference antenna; the transmission response of the reference antenna is a ratio of a signal sent by a transmit channel of the reference antenna to a signal received by a receive channel of a calibration channel when the signal sent by the transmit channel of the reference antenna is received by the receive channel of the calibration channel; the receiving response of the reference antenna is a ratio of a signal sent by a transmit channel of a calibration channel to a signal received by a receive channel of the reference antenna when the signal sent by the transmit channel of the calibration channel is received by the receive channel of the reference antenna. The detection module 910 sends the self-loopback responses, the transmission responses, and the receiving responses of the to-be-calibrated antenna and the reference antenna to the processing module 920.

The processing module 920 is configured to: receive the self-loopback responses, the transmission responses, and the receiving responses of the to-be-calibrated antenna and the reference antenna; determine, according to the transmission responses, and the receiving responses of the to-be-calibrated antenna and the reference antenna and according to transport channel responses, transmission responses and receiving responses that are of the to-be-calibrated antenna and the reference antenna and obtained after processing; and then determine, according to the transmission responses and the receiving responses that are of the to-be-calibrated antenna and the reference antenna and obtained after processing, a transmit channel compensation response and a receive channel compensation response that are of the to-be-calibrated antenna. The processing module 920 sends the transmit channel compensation response and the receive channel compensation response to the radio frequency calibration module 930.

The radio frequency calibration module 930 is configured to: receive the transmit channel compensation response and the receive channel compensation response; make compensation for the transmit channel of the to-be-calibrated antenna according to the transmit channel compensation response, so that a transmit channel response that is of the to-be-calibrated antenna and obtained after compensation is consistent with a transmit channel response of the reference antenna; and make compensation for the receive channel of the to-be-calibrated antenna according to the receive channel compensation response, so that a receive channel response that is of the to-be-calibrated antenna and obtained after compensation is consistent with a receive channel response of the reference antenna.

Optionally, the detection module 910 is further configured to detect a self-loopback response of a calibration channel, where the self-loopback response of the calibration channel is a ratio of a signal sent by a transmit channel of the calibration channel to a signal received by a receive channel of the calibration channel when the signal sent by the transmit channel of the calibration channel is received by the receive channel of the calibration channel.

Optionally, the processing module 920 is further configured to: number the to-be-calibrated antenna and the reference antenna together, and determine, according to the following formula, a transport channel response H(n) of an antenna whose sequence number is n.

$$H(n)=[(H_T(n)H_R(n))/(H_{CYC}(n)*H_{CYC}(M))]^{1/2};$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, $H_{CYC}(n)$ is a self-loopback response of the antenna whose sequence number is n, M is a sequence number of the calibration channel, M is a positive integer, and $H_{CYC}(M)$ is a self-loopback response of the calibration channel whose sequence number is M.

Optionally, the processing module 920 is further configured to: determine, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and determine, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n Optionally, the processing module 920 is further configured to: number the to-be-calibrated antenna and the reference antenna together, and determine, according to the following formula, a transport channel response H(n) of an antenna whose sequence number is n.

$$H(n)=[(H_T(n)H_R(n))/H_{CYC}(n)]^{1/2};$$

where n is a positive integer less than or equal to N, N is a total quantity of the to-be-calibrated antenna and the reference antenna, $H_T(n)$ is a transmission response of the antenna whose sequence number is n, $H_R(n)$ is a receiving response of the antenna whose sequence number is n, and $H_{CYC}(n)$ is a self-loopback response of the antenna whose sequence number is n.

Optionally, the processing module 920 is further configured to: obtain, according to the following formula, a transmission response $H_T(n)'$ that is of the antenna whose sequence number is n and obtained after processing:

$$H_T(n)'=H_T(n)/H(n);$$

where $H_T(n)'$ is the transmission response that is of the antenna whose sequence number is n and obtained after processing, and $H_T(n)$ is the transmission response of the antenna whose sequence number is n; and obtain, according to the following formula, a receiving response $H_R(n)'$ that is of the antenna whose sequence number is n and obtained after processing:

$$H_R(n)'=H_R(n)/H(n);$$

where $H_R(n)'$ is the receiving response that is of the antenna whose sequence number is n and obtained after processing, and $H_R(n)$ is the receiving response of the antenna whose sequence number is n.

Optionally, the processing module 920 is further configured to determine, according to the transmission responses and the receiving responses that are of the to-be-calibrated antenna and the reference antenna and obtained after processing, the transmit channel compensation response and the receive channel compensation response that are of the to-be-calibrated antenna, which is specifically: the processing module 920 is configured to determine, according to the following formula, a transmit channel compensation response $H_{TXC}(a)$ of a to-be-calibrated antenna whose sequence number is a:

$$H_{TXC}(a)=H_T(b)'/H_T(a)';$$

where a is the sequence number of the to-be-calibrated antenna, b is a sequence number of the reference antenna, a+b=N, N is the total quantity of the to-be-calibrated antenna and the reference antenna, $H_T(b)'$ is a transmission response that is of the reference antenna whose sequence number is b and obtained after processing, and $H_T(a)'$ is a transmission response that is of the to-be-calibrated antenna whose sequence number is a and obtained after processing; and the processing module 920 is configured to determine, according to the following formula, a receive channel compensation response $H_{RXC}(a)$ of the to-be-calibrated antenna whose sequence number is a:

$$H_{RXC}(a)=H_R(b)'/H_R(a)';$$

where $H_R(b)'$ is a receiving response that is of the reference antenna whose sequence number is b and obtained after processing, and $H_R(a)'$ is a receiving response that is of the to-be-calibrated antenna whose sequence number is a and obtained after processing.

It may be understood that the apparatus shown in FIG. 9 may execute all steps in the embodiment corresponding to FIG. 7 or FIG. 8.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementation manners.

In addition, some or all of functional units in the implementation manners of this application may be integrated into one chip or one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the implementation manners of this application. The foregoing storage medium includes: any medium that can store program code, such as a USB flash drive, a removable hard disk, a read-only memory, a random access memory, a magnetic disk, or an optical disc.

What is claimed is:

1. An apparatus, comprising:
   a processor; and
   a non-transitory computer readable storage medium storing a program for execution by the processor, the program including instructions to:
   detect self-loopback responses, transmission responses, and receiving responses of a to-be-calibrated antenna and a reference antenna;
   determine second transmission responses and second receiving responses of the to-be-calibrated antenna and the reference antenna according to the transmission responses, the receiving responses, and transport channel responses of the to-be-calibrated antenna and the reference antenna;
   determine a transmit channel compensation response and a receive channel compensation response of the to-be-calibrated antenna according to the second transmission responses and the second receiving responses of the to-be-calibrated antenna and the reference antenna after determining the second transmission responses and the second receiving responses;
   compensate for a transmit channel of the to-be-calibrated antenna according to the transmit channel compensation response, wherein a transmit channel response of the to-be-calibrated antenna is consistent with t transmit channel response of the reference antenna; and
   compensate for a receive channel of the to-be-calibrated antenna according to the receive channel compensation response, wherein a receive channel response of the to-be-calibrated antenna is consistent with a receive channel response of the reference antenna;
   wherein the self-loopback response of the to-be-calibrated antenna is a ratio of a signal sent by a transmit channel of the to-be-calibrated antenna to a signal received by a receive channel of the to-be-calibrated antenna in response to the signal sent by the transmit channel of the to-be-calibrated antenna being received by the receive channel of the to-be-calibrated antenna;

wherein the transmission response of the to-be-calibrated antenna is a ratio of the signal sent by the transmit channel of the to-be-calibrated antenna to a signal received by a receive channel of a calibration channel in response to the signal sent by the transmit channel of the to-be-calibrated antenna being received by the receive channel of the calibration channel;

wherein the receiving response of the to-be-calibrated antenna is a ratio of a signal sent by a transmit channel of a calibration channel to a signal received by a receive channel of the to-be-calibrated antenna in response to the signal sent by the transmit channel of the calibration channel being received by the receive channel of the to-be-calibrated antenna;

wherein the self-loopback response of the reference antenna is a ratio of a signal sent by a transmit channel of the reference antenna to a signal received by a receive channel of the reference antenna in response to the signal sent by the transmit channel of the reference antenna being received by the receive channel of the reference antenna;

wherein the transmission response of the reference antenna is a ratio of the signal sent by the transmit channel of the reference antenna to the signal received by the receive channel of a calibration channel in response to the signal sent by the transmit channel of the reference antenna being received by the receive channel of the calibration channel; and wherein the receiving response of the reference antenna is a ratio of the signal sent by the transmit channel of a calibration channel to the signal received by the receive channel of the reference antenna in response to the signal sent by the transmit channel of the calibration channel being received by the receive channel of the reference antenna.

2. The apparatus according to claim 1, wherein the instructions further comprise instructions to:

detect a self-loopback response of a calibration channel, wherein the self-loopback response of the calibration channel is a ratio of a signal sent by a transmit channel of the calibration channel to a signal received by a receive channel of the calibration channel in response to the signal sent by the transmit channel of the calibration channel being received by the receive channel of the calibration channel.

3. The apparatus according to claim 2, wherein the instructions further comprise instructions to:

number the to-be-calibrated antenna and the reference antenna together; and determine a transport channel response H(n) of an antenna having a sequence number n, according to:

$H(n)=[(H_T(n)H_R(n))/(H_{CYC}(n)*H_{CYC}(M))]^{1/2}$; and wherein n is a positive integer less than or equal to N, N is a total quantity of the to-be-calibrated antenna and the reference antenna, $H_T(n)$ is a transmission response of the antenna having the sequence number n, $H_R(n)$ is a receiving response of the antenna having the sequence number n, $H_{CYC}(n)$ is a self-loopback response of the antenna having the sequence number is n, M is a sequence number of the calibration channel, M is a positive integer, and $H_{CYC}(M)$ is a self-loopback response of the calibration channel having the sequence number is M.

4. The apparatus according to claim 3, wherein the instructions further comprise instructions to:

determine a transmission response $H_T(n)$ of the antenna having the sequence number n, according to:

$H_T(n)'=H_T(n)/H(n)$;

wherein $H_T(n)'$ is the transmission response of the antenna having the sequence number is n, and $H_T(n)$ is the transmission response of the antenna whose sequence number is n; and determine a receiving response $H_R(n)'$ of the antenna having the sequence number n, according to:

$H_R(n)'=H_R(n)/H(n)$; and wherein $H_R(n)'$ is the receiving response of the antenna having the sequence number n, and $H_R(n)$ is the receiving response of the antenna having the sequence number n.

5. The apparatus according to claim 4, wherein the instructions further comprise instructions to:

determine a transmit channel compensation response $H_{TXC}(a)$ of a to-be-calibrated antenna having the sequence number a, according to:

$H_{TXC}(a)=H_T(b)'/H_T(a)'$;

wherein a is the sequence number of the to-be-calibrated antenna, b is a sequence number of the reference antenna, a+b=N, N is the total quantity of the to-be-calibrated antenna and the reference antenna, $H_T(b)'$ is a transmission response of the reference antenna having the sequence number b, and $H_T(a)'$ is a transmission response of the to-be-calibrated antenna having the sequence number a; and determine a receive channel compensation response $H_{RXC}(a)$ of the to-be-calibrated antenna whose sequence number is a, according to:

$H_{RXC}(a)=H_R(b)'/H_R(a)'$; and wherein $H_R(b)'$ is a receiving response that is of the reference antenna having the sequence number is b, and $H_R(a)'$ is a receiving response of the to-be-calibrated antenna having the sequence number a.

6. The apparatus according to claim 2, further comprising a calibration antenna, wherein the calibration channel is a transmit channel and a receive channel of the calibration antenna.

7. The apparatus according to claim 1, wherein the instructions further comprise instructions to:

number the to-be-calibrated antenna and the reference antenna together; and determine a transport channel response H(n) of an antenna whose sequence number is n, according to:

$H(n)=[(H_T(n)H_R(n))/H_{CYC}(n)]^{1/2}$; and wherein n is a positive integer less than or equal to N, N is a total quantity of the to-be-calibrated antenna and the reference antenna, $H_T(n)$ is a transmission response of the antenna having the sequence number n, $H_R(n)$ is a receiving response of the antenna having the sequence number n, and $H_{CYC}(n)$ is a self-loopback response of the antenna having the sequence number is n.

8. The apparatus according to claim 7, wherein the instructions further comprise instructions to:

obtain a transmission response $H_T(n)'$ of the antenna having the sequence number n, according to:

$$H_T(n)'=H_T(n)/H(n);$$

wherein $H_T(n)'$ is the transmission response of the antenna having the sequence number n, and $H_T(n)$ is the transmission response of the antenna having the sequence number n; and obtain a receiving response $H_R(n)'$ of the antenna having the sequence number n, according to:

$$H_R(n)'=H_R(n)/H(n); \text{ and}$$

wherein $H_R(n)'$ is the receiving response of the antenna having the sequence number n, and $H_R(n)$ is the receiving response of the antenna having the sequence number n.

9. The apparatus according to claim 8, wherein the instructions further comprise instructions to:

determine a transmit channel compensation response $H_{TXC}(a)$ of a to-be-calibrated antenna having the sequence number a, according to:

$$H_{TXC}(a)=H_T(b)'/H_T(a)';$$

wherein a is the sequence number of the to-be-calibrated antenna, b is a sequence number of the reference antenna, a+b=N, N is the total quantity of the to-be-calibrated antenna and the reference antenna, $H_T(b)'$ is a transmission response of the reference antenna having the sequence number is b, and $H_T(a)'$ is a transmission response of the to-be-calibrated antenna having the sequence number a; and determine a receive channel compensation response $H_{RXC}(a)$ of the to-be-calibrated antenna having the sequence number a, according to:

$$H_{RXC}(a)=H_R(b)'/H_R(a)'; \text{ and}$$

wherein $H_R(b)'$ is a receiving response of the reference antenna having the sequence number is b, and $H_R(a)'$ is a receiving response of the to-be-calibrated antenna having the sequence number a.

10. The apparatus according to claim 1, further comprising a calibration antenna, wherein the calibration channel is a transmit channel and a receive channel of the calibration antenna.

11. A method comprising:

detecting self-loopback responses, transmission responses, and receiving responses of a to-be-calibrated antenna and a reference antenna;

determining second transmission responses and second receiving responses of the to-be-calibrated antenna and the reference antenna according to the self-loopback responses, the transmission responses, the receiving responses, and transport channel responses of the to-be-calibrated antenna and the reference antenna;

determining a transmit channel compensation response and a receive channel compensation response of the to-be-calibrated antenna, according to the transmission responses and the receiving responses of the to-be-calibrated antenna and the reference antenna, after determining the second transmission responses and the second receiving responses;

compensating for a transmit channel of the to-be-calibrated antenna according to the transmit channel compensation response, wherein a transmit channel response of the to-be-calibrated antenna is consistent with a transmit channel response of the reference antenna; and compensating for a receive channel of the to-be-calibrated antenna according to the receive channel compensation response, wherein a receive channel response of the to-be-calibrated antenna is consistent with a receive channel response of the reference antenna;

wherein the self-loopback response of the to-be-calibrated antenna is a ratio of a signal sent by a transmit channel of the to-be-calibrated antenna to a signal received by a receive channel of the to-be-calibrated antenna in response to the signal sent by the transmit channel of the to-be-calibrated antenna being received by the receive channel of the to-be-calibrated antenna;

wherein the transmission response of the to-be-calibrated antenna is a ratio of the signal sent by a transmit channel of the to-be-calibrated antenna to a signal received by a receive channel of a calibration channel in response to the signal sent by the transmit channel of the to-be-calibrated antenna being received by the receive channel of the calibration channel;

wherein the receiving response of the to-be-calibrated antenna is a ratio of a signal sent by a transmit channel of a calibration channel to the signal received by a receive channel of the to-be-calibrated antenna in response to the signal sent by the transmit channel of the calibration channel being received by the receive channel of the to-be-calibrated antenna;

wherein the self-loopback response of the reference antenna is a ratio of a signal sent by a transmit channel of the reference antenna to a signal received by a receive channel of the reference antenna in response to the signal sent by the transmit channel of the reference antenna being received by the receive channel of the reference antenna;

wherein the transmission response of the reference antenna is a ratio of the signal sent by a transmit channel of the reference antenna to the signal received by a receive channel of the calibration channel in response to the signal sent by the transmit channel of the reference antenna being received by the receive channel of the calibration channel; and wherein the receiving response of the reference antenna is a ratio of the signal sent by the transmit channel of the calibration channel to the signal received by the receive channel of the reference antenna in response to the signal sent by the transmit channel of the calibration channel being received by the receive channel of the reference antenna.

12. The method according to claim 11, further comprising:

detecting a self-loopback response of the calibration channel, before determining the transmission responses, the receiving responses, and transport responses, wherein the self-loopback response of the calibration channel is a ratio of a signal sent by a transmit channel of the calibration channel to the signal received by the receive channel of the calibration channel in response to the signal sent by the transmit channel of the calibration channel being received by the receive channel of the calibration channel.

13. The method according to claim 12, further comprising:

numbering the to-be-calibrated antenna and the reference antenna together, after detecting the self-loopback response of the calibration channel and before determining the transmission responses, the receiving responses, and transport channel responses of the to-be-calibrated antenna and the reference antenna; and determining a transport channel response H(n) of an antenna having a sequence number n, according to:

$H(n)=[(H_T(n)H_R(n))/(H_{CYC}(n)*H_{CYC}(M))]^{1/2}$; and wherein n is a positive integer less than or equal to N, N is a total quantity of the to-be-calibrated antenna and the reference antenna, $H_T(n)$ is a transmission response of the antenna having the sequence number is n, $H_R(n)$ is a receiving response of the antenna having the sequence number n, $H_{CYC}(n)$ is a self-loopback response of the antenna having the sequence number is n, M is a sequence number of the calibration channel, M is a positive integer, and $H_{CYC}(M)$ is a self-loopback response of the calibration channel having the sequence number M.

14. The method according to claim 13, wherein determining, according to the transport channel responses, the transmission responses, and the receiving responses of the to-be-calibrated antenna and the reference antenna and obtained after processing comprises:

determining, a transmission response $H_T(n)'$ of the antenna having a sequence number n, according to:

$H_T(n)'=H_T(n)/H(n)$;

wherein $H_T(n)'$ is the transmission response of the antenna having the sequence number n, and $H_T(n)$ is the transmission response of the antenna having the sequence number n; and determining a receiving response $H_R(n)'$ of the antenna having the sequence number n, according to:

$H_R(n)'=H_R(n)/H(n)$; and wherein $H_R(n)'$ is the receiving response of the antenna having the sequence number n, and $H_R(n)$ is the receiving response of the antenna having the sequence number n.

15. The method according to claim 14, wherein determining, according to the transmission responses and the receiving responses of the to-be-calibrated antenna and the reference antenna, the transmit channel compensation response and the receive channel compensation response of the to-be-calibrated antenna comprises:

determining a transmit channel compensation response $H_{TXC}(a)$ of a to-be-calibrated antenna having a sequence number a, according to:

$H_{TXC}(a)=H_T(b)'/H_T(a)'$;

wherein a is the sequence number of the to-be-calibrated antenna, b is a sequence number of the reference antenna, a+b=N, N is the total quantity of the to-be-calibrated antenna and the reference antenna, $H_T(b)'$ is a transmission response that is of the reference antenna having the sequence number b, and $H_T(a)'$ is a transmission response of the to-be-calibrated antenna having the sequence number a; and determining a receive channel compensation response $H_{RXC}(a)$ of the to-be-calibrated antenna having a sequence number a, according to:

$H_{RXC}(a)=H_R(b)'/H_R(a)'$; and wherein $H_R(b)'$ is a receiving response of the reference antenna having the sequence number b, and $H_R(a)'$ is a receiving response of the to-be-calibrated antenna having the sequence number is a.

16. The method according to claim 11, further comprising:

numbering the to-be-calibrated antenna and the reference antenna together, before determining the transmission responses and the receiving responses of the to-be-calibrated antenna and the reference antenna; and determining a transport channel response H(n) of an antenna having a sequence number n, according to:

$H(n)=[(H(n)H_R(n))/H_{CYC}(n)]^{1/2}$; and wherein n is a positive integer less than or equal to N, N is a total quantity of the to-be-calibrated antenna and the reference antenna, $H_T(n)$ is a transmission response of the antenna having the sequence number is n, $H_R(n)$ is a receiving response of the antenna having the sequence number n, and $H_{CYC}(n)$ is a self-loopback response of the antenna having the sequence number n.

17. The method according to claim 16, wherein determining the transmission responses and the receiving responses of the to-be-calibrated antenna and the reference antenna comprises:

obtaining a transmission response $H_T(n)'$ having the sequence number n, according to:

$H_T(n)'=H_T(n)/H(n)$;

wherein $H_T(n)'$ is the transmission response of the antenna having the sequence number is n, and $H_T(n)$ is the transmission response of the antenna having the sequence number n; and obtaining a receiving response $H_R(n)'$ of the antenna having the sequence number n, according to:

$H_R(n)'=H_R(n)/H(n)$; and wherein $H_R(n)'$ is the receiving response of the antenna having the sequence number n, and $H_R(n)$ is the receiving response of the antenna having the sequence number n.

18. The method according to claim 17, wherein determining the transmit channel compensation response and the receive channel compensation response of the to-be-calibrated antenna comprises:

determining a transmit channel compensation response $H_{TXC}(a)$ of a to-be-calibrated antenna having the sequence number a, according to:

$H_{TXC}(a)=H_T(b)'/H_T(a)'$;

wherein a is the sequence number of the to-be-calibrated antenna, b is a sequence number of the reference antenna, a+b=N, N is the total quantity of the to-be-calibrated antenna and the reference antenna, $H_T(b)'$ is a transmission response of the reference antenna having the sequence number b, and $H_T(a)'$ is a transmission response of the to-be-calibrated antenna having the sequence number a; and determining a receive channel compensation response $H_{RXC}(a)$ of the to-be-calibrated antenna having the sequence number a, according to:

$H_{RXC}(a)=H_R(b)'/H_R(a)'$; and wherein $H_R(b)'$ is a receiving response having the sequence number is b, and $H_R(a)'$ is a receiving response of the to-be-calibrated antenna having the sequence number a.

19. A non-transitory computer readable medium that stores a program for execution by a processor, the program including instructions to:

detect self-loopback responses, transmission responses, and receiving responses of a to-be-calibrated antenna and a reference antenna;

determine second transmission responses and second receiving responses of the to-be-calibrated antenna and the reference antenna according to the transmission responses, the receiving responses, and transport channel responses of the to-be-calibrated antenna and the reference antenna;

determine a transmit channel compensation response and a receive channel compensation response of the to-be-calibrated antenna according to the second transmission responses and the second receiving responses of the to-be-calibrated antenna and the reference antenna after determining the second transmission responses and the second receiving responses;

compensate for a transmit channel of the to-be-calibrated antenna according to the transmit channel compensation response, wherein a transmit channel response of the to-be-calibrated antenna is consistent with t transmit channel response of the reference antenna; and compensate for a receive channel of the to-be-calibrated antenna according to the receive channel compensation response, wherein a receive channel response of the to-be-calibrated antenna is consistent with a receive channel response of the reference antenna;

wherein the self-loopback response of the to-be-calibrated antenna is a ratio of a signal sent by a transmit channel of the to-be-calibrated antenna to a signal received by a receive channel of the to-be-calibrated antenna in response to the signal sent by the transmit channel of the to-be-calibrated antenna being received by the receive channel of the to-be-calibrated antenna;

wherein the transmission response of the to-be-calibrated antenna is a ratio of the signal sent by the transmit channel of the to-be-calibrated antenna to a signal received by a receive channel of a calibration channel in response to the signal sent by the transmit channel of the to-be-calibrated antenna being received by the receive channel of the calibration channel;

wherein the receiving response of the to-be-calibrated antenna is a ratio of a signal sent by a transmit channel of a calibration channel to a signal received by a receive channel of the to-be-calibrated antenna in response to the signal sent by the transmit channel of the calibration channel being received by the receive channel of the to-be-calibrated antenna;

wherein the self-loopback response of the reference antenna is a ratio of a signal sent by a transmit channel of the reference antenna to a signal received by a receive channel of the reference antenna in response to the signal sent by the transmit channel of the reference antenna being received by the receive channel of the reference antenna;

wherein the transmission response of the reference antenna is a ratio of the signal sent by a transmit channel of the reference antenna to the signal received by a receive channel of a calibration channel in response to the signal sent by the transmit channel of the reference antenna being received by the receive channel of the calibration channel; and wherein the receiving response of the reference antenna is a ratio of the signal sent by a transmit channel of a calibration channel to the signal received by a receive channel of the reference antenna in response to the signal sent by the transmit channel of the calibration channel being received by the receive channel of the reference antenna.

\* \* \* \* \*